US012150435B2

(12) United States Patent
Martineau

(10) Patent No.: US 12,150,435 B2
(45) Date of Patent: *Nov. 26, 2024

(54) SYSTEMS AND METHODS FOR AQUATIC ORGANISM IMAGING

(71) Applicant: Martineau & Associates, Menlo Park, CA (US)

(72) Inventor: Pierre R. Martineau, Menlo Park, CA (US)

(73) Assignee: Martineau & Associates, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,563

(22) Filed: Jun. 19, 2023

(65) Prior Publication Data

US 2023/0329198 A1 Oct. 19, 2023

Related U.S. Application Data

(63) Continuation of application No. 17/807,706, filed on Jun. 17, 2022, now Pat. No. 11,723,345, which is a
(Continued)

(51) Int. Cl.
*A01K 63/00* (2017.01)
*A01K 63/06* (2006.01)
(Continued)

(52) U.S. Cl.
CPC ............ *A01K 63/006* (2013.01); *A01K 63/06* (2013.01); *G06T 7/97* (2017.01); *G06T 7/292* (2017.01); *G06T 2207/10004* (2013.01)

(58) Field of Classification Search
None
See application file for complete search history.

(56) References Cited

U.S. PATENT DOCUMENTS 5,222,458 A 6/1993 Pippy
6,304,289 B1 10/2001 Sakai et al.
(Continued)

FOREIGN PATENT DOCUMENTS

| CN | 103383564 B | 11/2013 |
|---|---|---|
| JP | 2007159456 A | 6/2007 |
| WO | 2019008330 A1 | 1/2019 |

OTHER PUBLICATIONS

Zhou et al., "Near-infrared imaging to quantify the feeding behavior of fish in aquaculture," Computers and Electronics in Agriculture 135 (2017) 233-241 (Year: 2017).*
(Continued)

*Primary Examiner* — Soo Shin
(74) *Attorney, Agent, or Firm* — Ahmann Kloke LLP

(57) ABSTRACT

An example aquatic imaging system comprises a light source, a first platform coupled with a image capture device and a second platform that is parallel to the platform, the image capture device having a first field of view, and, the second platform being coupled to a organism tank, first organism tank having an inner wall, outer wall and a base that defines a well capable of retaining water, the base being parallel to the second platform, the organism tank configured to receive a light beam originating from the light source and configured to project at least a portion of the light beam through the well and in a directional plane that is parallel to the base, the image capture device configured to direct the first field of view from the first platform through the well in the organism tank.

17 Claims, 28 Drawing Sheets

Related U.S. Application Data continuation of application No. 17/402,299, filed on Aug. 13, 2021, now Pat. No. 11,388,889.

(60) Provisional application No. 63/174,002, filed on Apr. 12, 2021, provisional application No. 63/066,157, filed on Aug. 14, 2020.

(51) Int. Cl.
    *G06T 7/00*     (2017.01)
    *G06T 7/292*     (2017.01)

(56) References Cited

U.S. PATENT DOCUMENTS

| | | | |
|---|---|---|---|
| 7,835,632 | B2 | 11/2010 | Kim et al. |
| 9,405,119 | B2 * | 8/2016 | Klapp .................. G06T 5/50 |
| 10,816,939 | B1 * | 10/2020 | Coleman .................. G01S 17/86 |
| 11,723,345 | B2 * | 8/2023 | Martineau ............ A01K 63/006 |
| | | | 119/267 |
| 2005/0123174 | A1 | 6/2005 | Gorsky et al. |
| 2018/0376067 | A1 * | 12/2018 | Martineau .............. H04N 23/60 |
| 2019/0174689 | A1 | 6/2019 | Shoham et al. |
| 2021/0212298 | A1 * | 7/2021 | Messana ................ A01K 61/13 |

OTHER PUBLICATIONS

García-Melo et al., "Photafish system: An affordable device for fish photography in the wild," Zootaxa 4554 (1): 141-172, published: Feb. 8, 2019 (Year: 2019).*
International Search Report for PCT/US21/46036 mailed Dec. 1, 2021, 14 pages.
European Patent application No. 21856833.5, Extended European Search Report dated Aug. 27, 2024, 12 pages.

* cited by examiner

SYSTEMS AND METHODS FOR AQUATIC ORGANISM IMAGING

CROSS-REFERENCE TO RELATED APPLICATIONS

The present application is a continuation of U.S. patent application Ser. No. 17/807,706, filed Jun. 17, 2022, entitled "Systems and Methods for Aquatic Organism Imaging," which is a continuation of U.S. patent application Ser. No. 17/402,299, filed Aug. 13, 2021, entitled "Systems and Methods for Aquatic Organism Imaging," issued as U.S. Pat. No. 11,388,889, which claims the benefit of U.S. Provisional Patent Application No. 63/066,157, filed Aug. 14, 2020, entitled "Ethoware Systems and Methods," and U.S. Provisional Patent Application No. 63/174,002 filed Apr. 12, 2021, and entitled "Systems and Methods for Aquatic Macro-Organism Imaging," all of which are incorporated by reference herein.

FIELD OF THE INVENTION

Embodiments of the present invention generally relate to an apparatus capable of providing illumination and imaging aquatic organisms.

SUMMARY

An example aquatic imaging system comprises a first light source, a first platform, and a second platform. The first platform may be coupled to a first image capture device. The first image capture device may have a first field of view. The second platform may be parallel to the first platform and be coupled to a first organism tank. The first organism tank may have a first base that is parallel to the second platform. The first organism tank may also have at least one outer wall. The outer wall and the first base of the first organism tank may define at least one well capable of retaining water. The first organism tank may be configured to receive a first light beam originating from the first light source and configured to project at least a portion of the first light beam through the first well and in a directional plane that is parallel to the first base of the first organism tank. The first image capture device may be configured to direct the first field of view from the first platform to at least the first well in the first organism tank.

The second platform may support the base of the first organism tank. The organism tank may include a bottom and an open top. The bottom being the base. A side of the outer wall not facing the well may be at a 90 degree angle to the base. The first image capture device may be configured to direct the first field of view to the open top of the organism tank.

In some embodiments, the second platform is coupled to a second organism tank in addition to the first organism tank. Further, the first platform may be coupled to a second image capture device. In this example, the second organism tank may be configured to receive a second light beam originated from the first light source and may be configured to project at least a portion of the second light beam through a second well and in a directional plane that is parallel to a base of the second organism tank. The second image capture device may be configured to direct the second field of view from the first platform to at least the well in the second organism tank. The first and second field of views may occupy separate and distinct areas from each other.

The system may further comprise a beam splitting device configured to split light received from the first light source into the first light beam and the second light beam. In some embodiments, the first image capture device is capable of generating images of the first well of the first organism tank simultaneously as the second image capture device generates images of the second well of the second organism tank.

The at least one outer wall having a height from the first base of the tank organism tank may be that is less than a fourth of a distance between the first platform and the second platform.

In some embodiments, the first organism tank includes at least a first inner wall surrounding a central hole. The central hole may be at the center of the first organism tank. One side of the first inner wall may face one side of the outer wall. The first well may be further defined by the one side of the first inner wall facing the one side of the outer wall. The central hole may be configured to be coupled to a central optical assembly. The central optical assembly may be configured to project the at least a portion of the first light beam through the first well and in the directional plane that is parallel to the first base of the first organism tank.

The central optical assembly may include a conic mirror configured to receive at least the portion of the first light beam from below the first base and radially reflect the at least the portion of the first light beam from the central hole, through the first inner wall, and through the first well. The first inner wall may be transparent.

An example method comprises originating a first light beam from a first light source, transmitting at least a portion of a second light beam through at least one first well of a first organism tank coupled to a second platform, the first organism tank having at least one outer wall and a first base, the first base being parallel to the second platform, the at least one outer wall and the first base of the first organism tank defining the at least one first well, the at least one well being capable of retaining water, the at least the portion of the second light beam being transmitted in a directional plane that is parallel to the first base of the first organism tank, the second light beam being at least a part of the first light beam from the first light source, directing, with a first image capture device coupled to a first platform, a first field of view from the first platform to the at least the first well in the first organism tank, and capturing, with the first image capture device, at least one image of the at least one first well of the first organism tank while the at least the portion of the second light beam is transmitted through the at least one first well of the first organism tank.

DETAILED DESCRIPTION

Systems and methods are described herein to retain and observe aquatic organisms for scientific, aquaculture, and/or environmental purposes (e.g., aquatic pollution monitoring). Any aquatic organisms may be used, such as fish (e.g., zebrafish), amphibian larvae, invertebrates, or the like. It will be appreciated that images or videos of aquatic organisms may be captured to observe the effects of various tests or merely to record their natural behavior. Various embodiments described herein enable any number of aquatic organisms to be observed through an apparatus that allows for light to be transmitted parallel to the base of one or more organism tanks and a camera to take images or video from above or below the tanks. The systems and methods described herein may allow for detailed information of the behavior and reactions of the aquatic organisms to be reliably collected in a variety of different environments.

Figure 1:
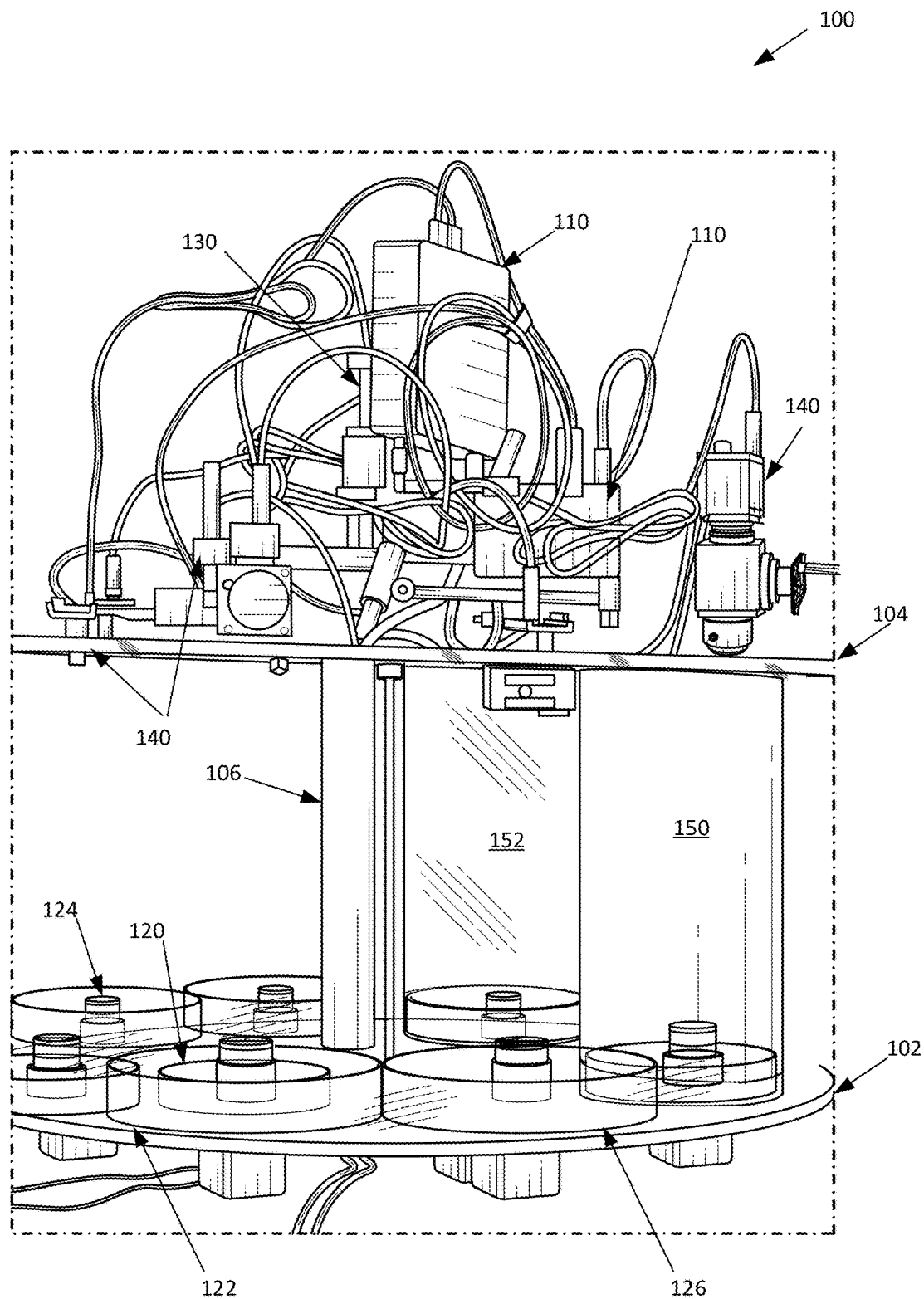
FIG. 1 depicts an example hardware system capable of providing a controlled environment to illuminate and capture images of aquatic organisms according to some embodiments.

FIG. 1 depicts an example hardware system 100 capable of providing a controlled environment to illuminate and retain aquatic organisms according to some embodiments. In this example, hardware system 100 includes a first platform 102, a second platform 104, a service conduit 106, an aquatic organism control system 110, a light source 130, and an image capture device 140 (individually the image capture device 140, collectively, the image capture devices 140).

In FIG. 1, the first platform 102 may support any number of organism tanks 120. An example organism tank (e.g., organism tank 1200) may be seen with regard to FIG. 12A. In one example, the organism tank 120 may appear as an unlidded, circular dish, almost resembling a petri dish, but with a center hole (e.g., center hole 1230) defined by an inner wall (e.g., inner wall 1220). The organism tank 120 may include an outer wall (e.g., outer wall 1210) along the perimeter of the base (e.g., base 1235) of the organism tank 120. The organism tank 120 may include a well (e.g., open reservoir) defined by the base, the side of the inner wall facing the outer wall along the perimeter of the organism tank, and the outer wall facing the well and the inner wall. The well may be waterproof and capable of holding liquid such as water. In some embodiments, aquatic animals may swim within water contained by the walls (e.g., contained within the well) of the organism tank 120. An organism tank 120 may have any diameter.

An organism tank 120 may include a central optical assembly 124 (discussed herein). The central optical assembly 124 may be inserted or coupled at least partially within the center hole. In some embodiments, the central optical assembly 124 may radially direct light from the central optical assembly 124 through the well in a direction that is parallel (or approximately parallel) to the base of the organism tank 120. In one example, the central optical assembly 124 may be configured to hold or surround a tank illuminator. For example, the central optical assembly 124 may be threaded to enable the tank illuminator to be screwed into the central optical assembly 124. A tank illuminator may be configured to radially transmit light (e.g., reflect light) relative to the central optical assembly 124 in a direction that is parallel to the base of the organism tank and/or the base of the first platform 102.

In some embodiments, an inner wall 1220 of the organism tank 120 is configured to hold or surround the central optical assembly 124. In various embodiments, the light that illuminates the organisms in the tank is in a directional plane that is parallel to the base of the first platform (i.e., horizontal). For example, the angle of incidence may be 90 degrees in the most frequent configuration of central optical assemblies.

Light provided by the central optical assembly 124 may be received from a first light source. The first light source may be placed in any location (e.g., not just attached to the first platform). In some configurations, the first light source is attached underneath the second platform, aiming at the input port labeled "Input Port for Beam Expander 810" in FIG. 8A (which in that configuration is rotated 90 degrees around the axis of the exiting beam). In another configuration, the first light source points up from underneath, in which case the input port for beam expander 810 is rotated 180 degrees. Light generated by the first light source may be transmitted in any direction.

Returning to FIG. 1, the system may include a second platform 104 that is coupled to at least one camera. In various embodiments, the second platform 104 may include a plurality of holes, each hole being located directly above an organism tank supported by the first platform 102. A camera or lens coupled to a camera (e.g., image capture devices) may be mounted or otherwise coupled to a hole of the second platform 104. Each camera or lens will direct a field of view to a well of a different organism tank. In one example, each camera or lens may be positioned directly above a center of an organism tank. The camera and/or lens may be focussed on the well of the organism tank. It will be appreciated that the camera and/or lens may be directed in a manner that is perpendicular to the base of the organism tank or at any angle.

In some embodiments, the organism tank 120 may be placed within a tank container 122. A tank container 122 may provide options to eliminate one or more factors from impacting the aquatic animals and/or image generation. The tank container may appear to be a larger version of the organism tank 120. Then organism tank 120 may fit within the tank container 122. The tank container 122 may include a tank illuminator holder that fits within the central optical assembly 124.

In various embodiments, a tank container does not surround an organism tank. For example, an organism tank 126, which may be the same size or substantially the same size as a tank container, is not surrounded by a tank container.

One or more of the organism tanks 120 may be surrounded by tank enclosures 150 and/or 152. A tank enclosure may provide walls and/or shielding that surround an organism tank 120 and/or a tank container 122. In one example, a tank enclosure may be opaque and serve to prevent light (e.g., one or more wavelengths) from impacting measurements, images, and/or aquatic life. A tank enclosure may be opaque, transparent, or a combination.

FIG. 1 will be discussed in conjunction with FIG. 2, which depicts a simplified block diagram of an example aquatic imaging system 200 capable of providing a controlled environment to illuminate and capture images of aquatic organisms. The example aquatic imaging system 200 represents a single tank system while FIG. 1 depicts a system that supports a plurality of tanks. The aquatic imaging system 200 includes a control system 210, an organism tank 220, a light source 230, an image capture device 240, and an environmental component 250. The optional environmental component 250 in this example includes a temperature control 252 and a behavior control 254. The system of FIG. 1 may include similar components to that of FIG. 2.

It will be appreciated that there may be one or more light sources 230. The light from the light sources 230 may be split to transmit any number of beams of light. There may be any number of image capture devices 240, and there may be any number of organism tanks 220.

In some embodiments, the first platform 102 supports multiple tanks, such as the organism tanks 120. The organism tanks 120 may be positioned on the first platform 102 in a symmetrical, rotational or circular pattern. It will be appreciated that the organism tanks 120 may be positioned on the first platform 102 in any number of ways and any number of patterns.

In some embodiments, the first platform 102 includes eight organism tanks 120, with each organism tank placed in a symmetrical, circular pattern. The first platform 102 may include any number of tank containers 122 and organism tanks 120. For example, the first platform 102 may include any number of tank containers 122 and any number of organism tanks 120. In some embodiments, the first platform 102 includes any number of multi-well tanks (discussed herein).

In some embodiments, the first platform 102 includes a number of organism tanks 120 and tank containers 122 which allow the organism tanks and tank containers to be placed in a symmetrical, circular pattern. Compactness of the hardware system 100 may leverage a benchtop vibration isolation platform below the hardware system 100 to insulate the system from external vibrations. Rotational symmetry may further allow for add-on components of the hardware system 100, such as light stimulation, noise stimulation, or water recirculation, to be synchronized and implemented in a tank-level or system-level rotational symmetry. The compactness, as well as the rotational symmetry of the hardware system 100, allows for synchronization of illumination or noise stimulation across the multiple organism tanks 120 for synchronized experiments involving aquatic organisms.

Figure 19A:
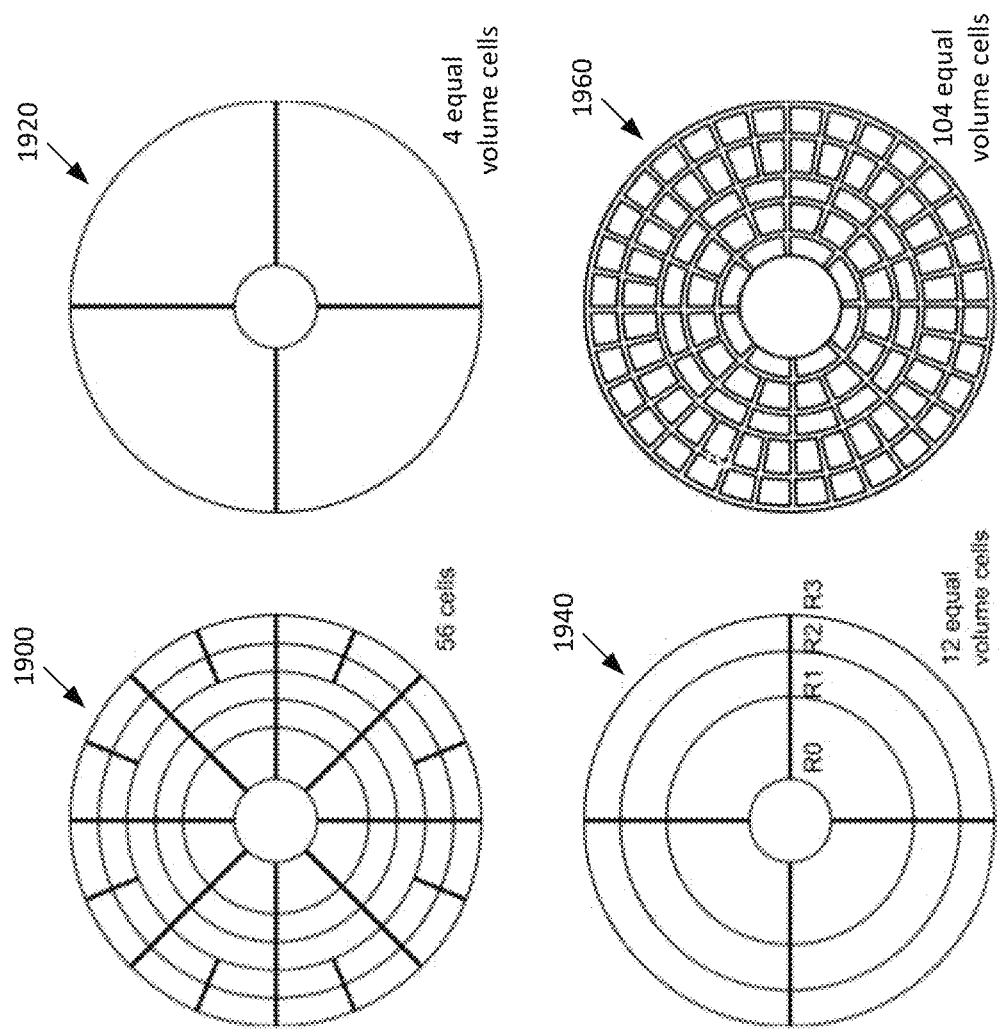
FIG. 19A depicts examples of multi-well tanks according to some embodiments.

The organism tank 120 may include a single well. A well may be filled with water or another liquid. A single well may allow the aquatic organisms or experimental subjects to have access to the entire volume of the organism tank 120. In some embodiments, the organism tank 120 may include multiple wells. A multi-well configuration is depicted in FIG. 19A. FIG. 19A depicts different configurations of multi-well organism tanks. Each organism tank may have a different configuration of wells. In some embodiments, the wells are coupled to the organism tank such that any number of wells may be detached and attached to any number of organism tanks. In this example, a plurality of different patterns of wells may be coupled to an organism tank. In various embodiments, the wells may not be symmetrical within the organism tank. Each of the wells in an example organism tank 1940 of FIG. 19A may have substantially the same volume. In some embodiments, any number of wells within an organism tank may have similar or different volumes.

In some embodiments, a tank unit may include the organism tank 120, the tank container 122, and the central optical assembly 124. Each of the organism tanks 120 may be filled with water, and aquatic organisms may be placed within the organism tanks 120, illuminated by a tank illuminator (held by the central optical assembly 124) and imaged by one of the multiple image capture devices 140.

In some embodiments, the aquatic organisms are macro-organisms, such as zebrafish larvae. Various examples of the hardware system discussed herein may be capable of imaging aquatic organisms typically ranging in size from $10^{-4}$ m or less to $10^{-2}$ m by adjusting the pixel resolution of an image sensor of the camera and/or adjusting the lens magnification of the camera. To image aquatic organisms larger than $10^{-2}$ m or 1 cm may require an increase of the height of the water column in the organism tank. The area occupied by the tank illuminator holder may increase with the square of the height of the water column in the organism tank.

In some embodiments, the organism tank 120 provides a self-centering mechanism. For example, the organism tank 120 may include an inner cylindrical wall or a center hole 1230 that fits the tank container's central optical assembly 124, which enforces centering. If no tank container is used, the organism tank's inner cylindrical wall may be threaded and screwed into a mirror port 820, acting as a centering guide for the organism tank 120.

Each of the organism tanks 120 may be placed within tank container 122. Tank container 122 may provide a place to anchor or thread the central optical assembly 124 and the organism tank 120. The tank container 122 may be threaded and screwed into a mirror port 820. A user of the hardware system 100 may switch out one or more of the organism tanks or central optical assembly 124 from a particular tank container 122, allowing for support for interchangeable plug-and-play components. For example, the user may replace one tank illuminator with a different tank illuminator. In some embodiments, this may be accomplished without disturbing the aquatic organisms in the organism tank 120.

In some embodiments, the tank holder 122 provides a noise isolation buffer to limit the propagation of noise to other organism tanks and tank containers. In some applications or experiments, a controlled transient noise may be introduced into one or more organism tanks 120 to trigger behaviors in the aquatic organisms in the organism tanks 120. To further increase noise isolations, organism tanks 120 may float within respective tank containers 122.

In one example, a tank container 122 may include a circular base with a diameter of 15 centimeters (cm) with a threaded hole in the center with a diameter of 25.4 millimeters (mm). Tank container 122 may include an outer cylindrical wall with a height of 20 mm, an outer diameter of 15 cm, an inner cylindrical wall with a height of 31 mm, and an inner diameter of 25.4 mm. In various embodiments, the diameter, inner cylindrical wall, and outer cylindrical wall may have different diameter and height measurements. Tank container 122 may provide a thermal buffer to the organism tank 120.

The organism tanks 120 and the tank containers 122 may be composed of any materials. In one example, the organism tanks 120 and/or tank containers 122 are composed of poly (methyl methacrylate) (PMMA) or acrylic. In various embodiments, to fabricate a transparent organism tank 120 or tank container 122, materials such as polycarbonate or fluorinated ethylene propylene (FEP) may be used. Materials may be chosen based on their refractive index close to that of water, such as FEP, to fabricate one or more of the organism tanks 120 or the tank containers 122 such that, once the organism tank 120 is filled with water, the organism tank 120 and/or the tank container 122, does not modify the trajectories of the electromagnetic energy into the water. The organism tank 120 and/or the tank container 122 may be opaque, translucent, or a combination. In some embodiments, to fabricate a partly or fully opaque organism tank 120 or tank container 122, materials such as high-density polyethylene (HDPE), polytetrafluoroethylene (PTFE), polyvinyl chloride (PVC), acrylonitrile butadiene styrene (ABS), aluminum, silver, biaxially-orientated polyethylene terephthalate (BoPET), or "Mylar," black paper, or fabric, may be used.

The central optical assembly 124 may be in the center of tank container 122 and/or the organism tank 120. The central optical assembly 124 may provide a rotationally symmetrical illumination field in the tank's region of interest (ROI) or the region where the aquatic organisms are present. In various embodiments, the central optical assembly 124 may be configured to direct illumination through the internal sides of one or more organism tanks 120 (e.g., the illumination being transmitted in a direction that is horizontal and parallel to the first platform 102).

The central optical assembly 124 may receive electromagnetic energy from the light source 130. In some embodiments, electromagnetic energy may travel from the light source 130 to the tank illuminator held by the central optical assembly 124 via an illumination light path. In some embodiments, the light source 130 is a laser that generates a beam of light that is expanded and split using a combination of lenses, mirrors, and beam splitters to illuminate any number of organism tanks 120. An example of the illumination light path can be seen in FIG. 7, which includes an optional beam expander 720 and a beam splitting assembly that split the light into eight different light beams (using beam splitters 730) for illuminating eight different organism tanks 120. The beam expander 720 may not be required if the laser generates a sufficiently large beam.

In some embodiments, the number of beam splitters used in the hardware system 100 is directly related to the number of organism tanks 120. In some embodiments, the illumination light path may distribute light from a single coherent source to multiple organism tanks positioned in a circle centered at the base disk 302 of the hardware system 100. For example, if the number of organism tank 120 is 2N, where N is an integer, the number of beam splitters is $(2^N-1)$. By using a beam splitter, properties or attributes, such as an arrival time at the organism tank 120 associated with each beam or light intensity of each beam in the beam splitter, may be substantially the same or different. In various embodiments, beams of light split by the beam splitting assembly may have properties similar to the primary light source, such as the wavelength of light, light intensity, phase, and degree of polarization. Further details regarding the beam expander and the beam splitting assembly will be described in FIG. 8A.

The first platform 102 may include tank enclosures 150 and 152.

Figure 13:
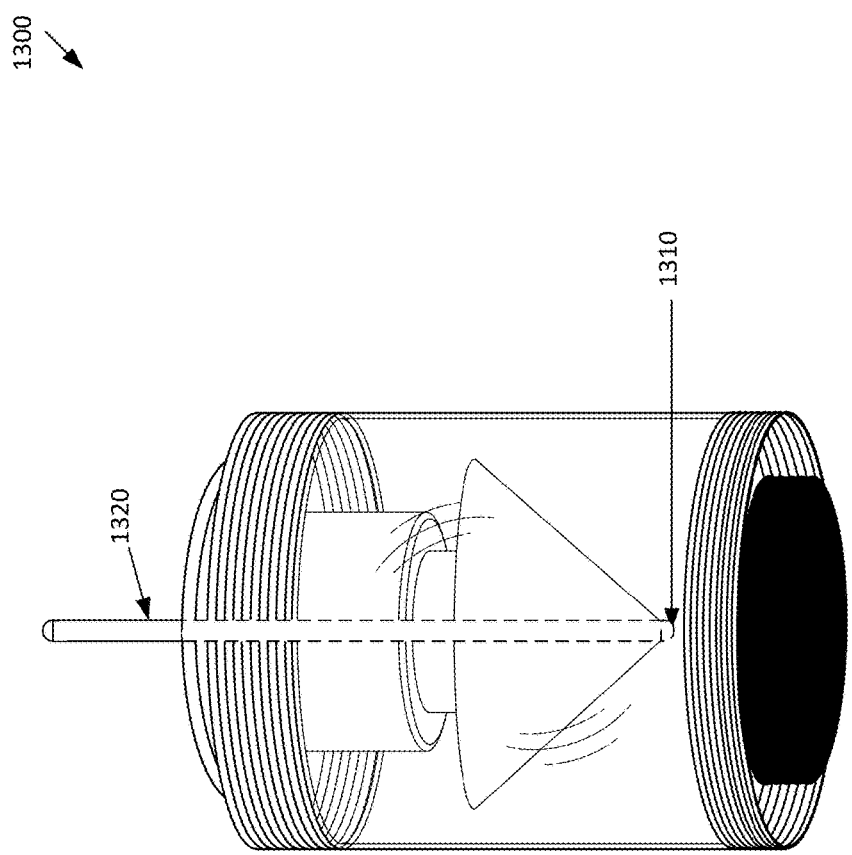
FIG. 13 depicts an example of a cone mirror, including a first surface mirror according to some embodiments.

The central optical assembly 124 may include a cone mirror that transforms incident, vertical light received from the light source 130 to a horizontal, rotationally symmetrical light field. An example of the cone mirror can be found in FIG. 13, which depicts an example cone mirror within a central optical assembly 1300. The example cone mirror in FIG. 13 depicts one embodiment of the cone mirror, which includes a metal mirror. In some embodiments, the metal is aluminum. The cone mirror in this example is a 45° reflective cone. Further details regarding the tank illuminator or cone mirror will be described in FIGS. 13, 14, and 15.

In one embodiment, the organism tank 220 includes one or more environmental components 250. Environmental components 250 may include behavior control mechanisms such as a tank enclosure 150, which is an opaque shielding that filters out certain wavelengths, such as visible light, from the organism tank 120. In some embodiments, the tank enclosure 150 may be composed of aluminum, mylar, or black-colored paper. In one embodiment, the tank enclosure 152 is a transparent shielding that is opaque to NIR radiation. In some embodiments, the tank enclosures 150 and 152 may include thermal insulation, noise insulation, and/or enforce constant hygrometric conditions.

One of the environmental components 250 may include temperature control 252. The temperature control 252 may include a mechanism to monitor and/or control the temperature of liquid or water in one or more of the organism tanks 120. These mechanisms may include thermometers and/or infrared sensors capable of measuring the temperature of the water in one or more organism tanks 120. If the temperature of the water is outside a predetermined temperature range, the temperature control 252 may send a signal to the aquatic organism control system 110. The aquatic organism control system 110, in turn, may send a notification to the user of the fluctuation in the temperature of one or more organism tanks 120.

Figure 21:
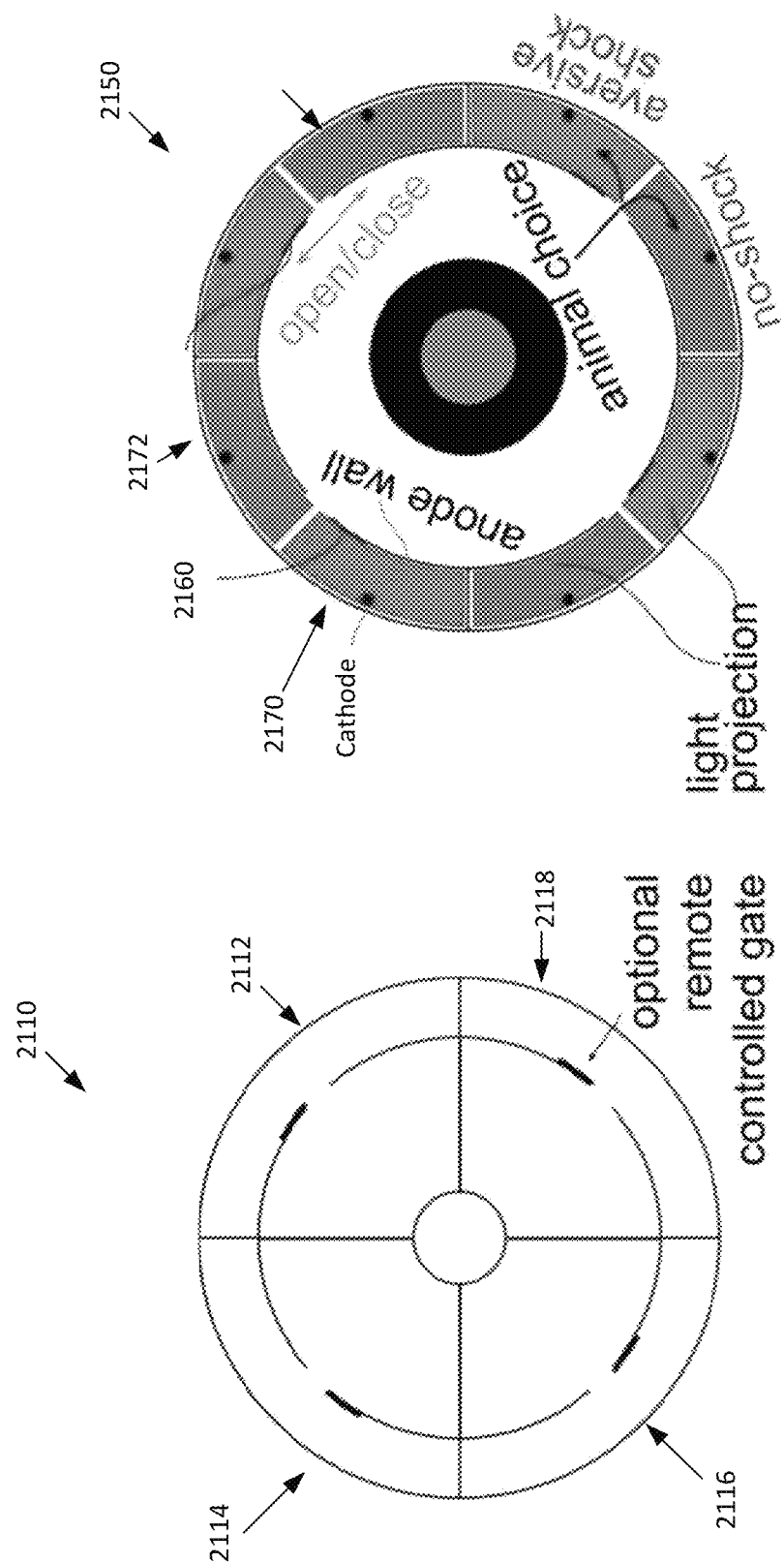
FIG. 21 depicts examples of behavioral control inserts to tank containers according to some embodiments.

The behavior control 254 may be or include an epsilon "ϵ" maze. An epsilon "ϵ" maze may include multiple sections of an area that is accessible by opening a gate or door. These mazes are referred to as an epsilon maze due to the shape of the maze, which resembles the Greek letter epsilon. FIG. 21 includes an example epsilon maze 2112, which is one of four epsilon mazes that is a part of a four-well compartmented organism tank. Further details regarding the epsilon maze will be described with regard to FIG. 21. In one example, the behavior control 254 includes interconnected organism tanks, which allow the aquatic organism to navigate from one tank enclosure to another tank enclosure. An example of interconnected organism tanks can be found in FIG. 23.

Figure 17:
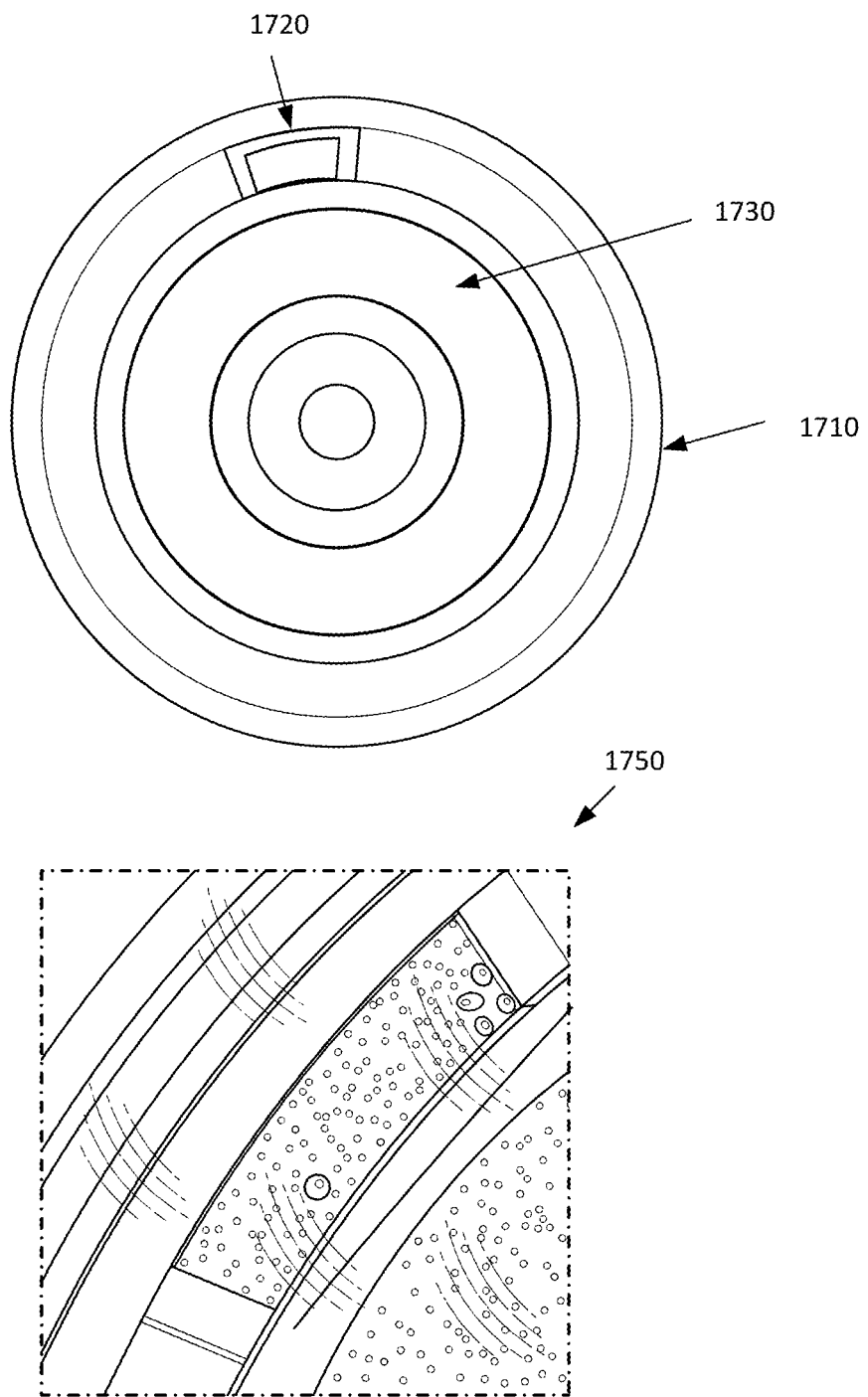
FIG. 17 depicts an image of a hatching chamber according to some embodiments.

In some embodiments, there may be a hatching chamber, such as a hatching chamber 1720 of FIG. 17. Embryos may be placed in the hatching chamber 1720, while other organisms, such as organisms after the embryos hatch, can be placed in a central area 1730 without requiring two separate tanks. In some embodiments, an organism tank insert may divide an organism tank into the hatching chamber 1720 and the central area 1730. Further details regarding the hatching chamber will be described with regard to FIG. 17. In one embodiment, the system may further include a recirculating water tank that allows water in one or more organism tanks to recirculate the water to filter out waste and provide the oxygen required to sustain life.

The second platform 104 may support multiple image capture devices 140. Using the second platform 104, one or more image capture devices 140 may be positioned directly above or substantially above one or more organism tanks 120. Alternatively, one or more image capture devices 140 may be placed directly below or substantially below one or more organism tanks.

In some embodiments, one or more of the image capture devices 140 may be or include a digital camera capable of capturing digital images and digital video. When the second platform 104 is positioned above the first platform 102, the first platform 102 may be referred to as a base disk, and the second platform 104 may be referred to as an elevated disk. It will be appreciated that the first platform 102 and the second platform 104 may be any shape (e.g., circular, square, rectangular, polygonal, or the like). The first platform 102 and the second platform 104 may be different or similar shapes. Placement of the second platform 104 may also allow for heat from the electronic components of the hardware system 100, such as the aquatic organism control system 110, to dissipate with minimal impact on the organism tanks 120.

The image capture device 140 is an imaging sensor that may capture one or more images of a scene in the form of a data stream (an image stream, a pixel stream, byte stream, or the like). In some embodiments, the image capture device 140 uses an exposure time that is inverse of the frame rate of the image capture device 140. The image capture device 140 may be coupled to the aquatic organism control system 110. In some embodiments, one or more of the image capture devices 140 is positioned below or substantially below one of the organism tanks 120.

The aquatic organism control system 110 may receive a data stream captured by sensors, extract motion information from the data stream, and store the data via a storage component. The storage component may store images, information extracted from the images, and other data generated by the image capture device 140. The hardware system 100 may access the storage and an optional display via a network or directly.

In some embodiments, the service conduit 106 provides structural support for the first platform 102 and the second platform 104. In some embodiments, the service conduit 106 provides a mechanism to organize power cables and the like that runs between the first platform 102, the second platform 104, and an environment outside the hardware system 100. In various embodiments, the service conduit 106 provides support and optical isolation to the beam expander of the illumination light path. The service conduit 106 may include optical fibers or other optical materials for transmitting light which may be split and/or redirected to the different organism tanks 120. In some embodiments, the service conduit 106 may include clips (e.g., coupled to the service conduit 106 and configured to hold one or more fibers and/or cables along the service conduit 106) or be hollow to run cables between the two platforms 102 and 104.

In some embodiments, the service conduit 106 may be optional and may be replaced with a central cylinder tank which provides support for the second platform 104. An example of the central cylinder tank may be found in FIG. 4, which depicts a configuration of the first platform 102, which supports eight organism tanks, eight tank containers, and a central cylinder. The central cylinder may provide noise insulation, thermal insulation, or a passive, noise-free water recirculation. An example of the passive, noise-free water recirculation provided by the central cylinder will be discussed further with regard to FIG. 21.

In some embodiments, the aquatic organism control system 110 includes at least one processor and memory. The aquatic organism control system 110 may generate commands and parameters with which the aquatic organism control system 110 controls the equipment or hardware of the hardware system 100. In various embodiments, the processor is one or several CPUs, GPUs, FPGAs, VLSI, and/or smart sensor chips. Any number of methods and operations performed by the aquatic organism control system 110 may be performed sequentially or in parallel depending on the task and thus takes advantage of CPU architectures that facilitate parallel processing. It may be appreciated that the memory of aquatic organism control system 110 may comprise non-transitory computer-readable media and may be implemented using any suitable memory technology, such as static random access memory (SRAM), synchronous dynamic RAM (SDRAM), nonvolatile/Flash-type memory, or any other type of memory. The memory of the aquatic organism control system 110 may store program instructions, image data, or the like.

In some embodiments, the system creates darkfield illumination conditions and allows aquatic organisms in the organism tank to receive visible incident light. The hardware system may illuminate the aquatic organisms with a horizontal light field from a narrow band, near-infrared (NIR) light source.

In some embodiments, the hardware system may include an image capture device that captures digital images or videos from a vertical field of view. For example, the image capture device may be supported on a platform that is placed directly above or below an organism tank. In some embodiments, the system includes a secondary light source that is a visible-spectrum NIR-free light source. The secondary light source may be, for example, an electromagnetic energy source from which wavelengths from the NIR spectrum have been filtered.

The image capture device may be fitted with an optional narrow bandpass filter. In some embodiments, the narrow bandpass filter may be unnecessary when an opaque enclosure is used and visible light is provided.

A neutral density filter may be fitted to the image capture device to allow recording long exposure images without saturation.

In some embodiments, wavelengths outside the NIR spectrum may be filtered out by using NIR opaque or NIR absorbing materials to fabricate the organism tank, the tank container, or the tank enclosure. In some embodiments, the intensity of the darkfield illumination may be increased to dominate stray ambient NIR.

In some embodiments, the system includes a base platform that supports a number of organism tanks and tank containers. In this configuration, the base platform allows the organism tank and tank containers to be placed in a symmetrical, circular pattern. The overall rotational symmetry of the organism tank and tank containers may provide compactness. The compactness, as well as the rotational symmetry of the hardware system, may allow for synchronization of illumination or noise stimulation across the multiple organism tanks for synchronized experiments involving aquatic organisms.

The hardware system may be placed on a benchtop vibration isolation platform to insulate the system from external vibrations.

One or more components of the hardware system may be composed of one or more of poly (methyl methacrylate), polycarbonate, or FEP.

Figure 2:
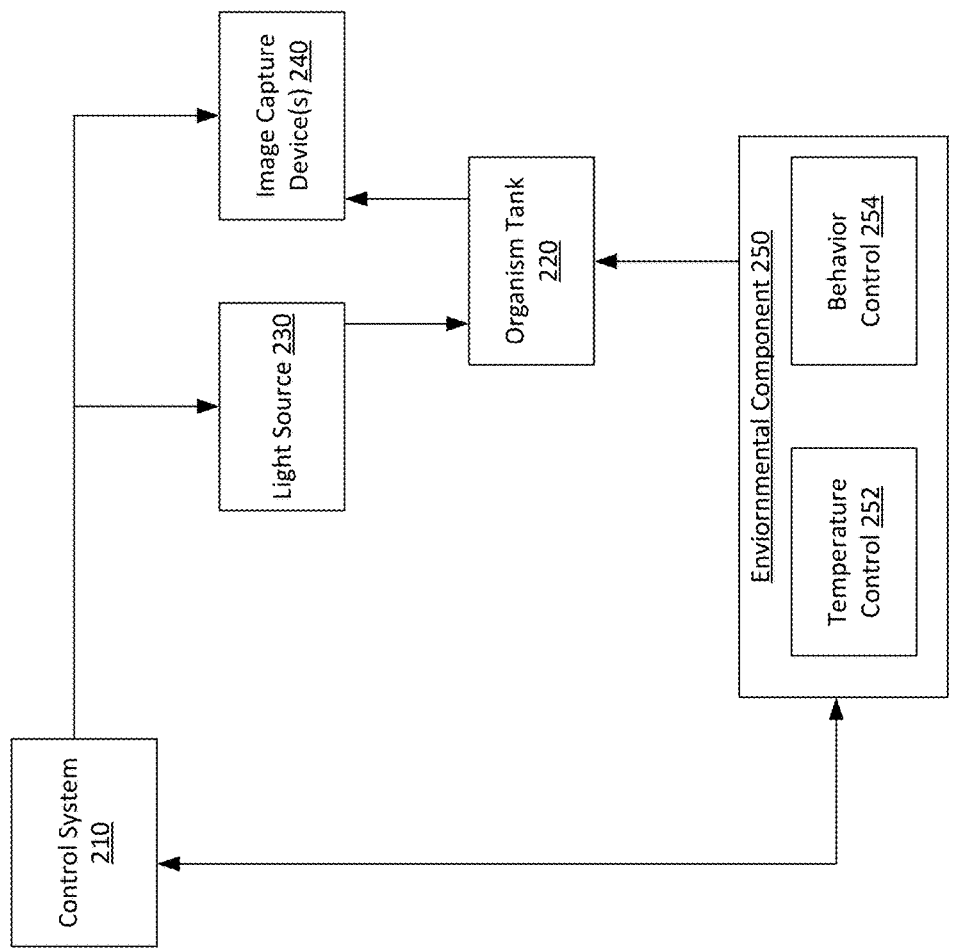
FIG. 2 depicts a block diagram of an example aquatic imaging system capable of providing a controlled environment to illuminate and capture images of aquatic organisms.
Figure 3A:
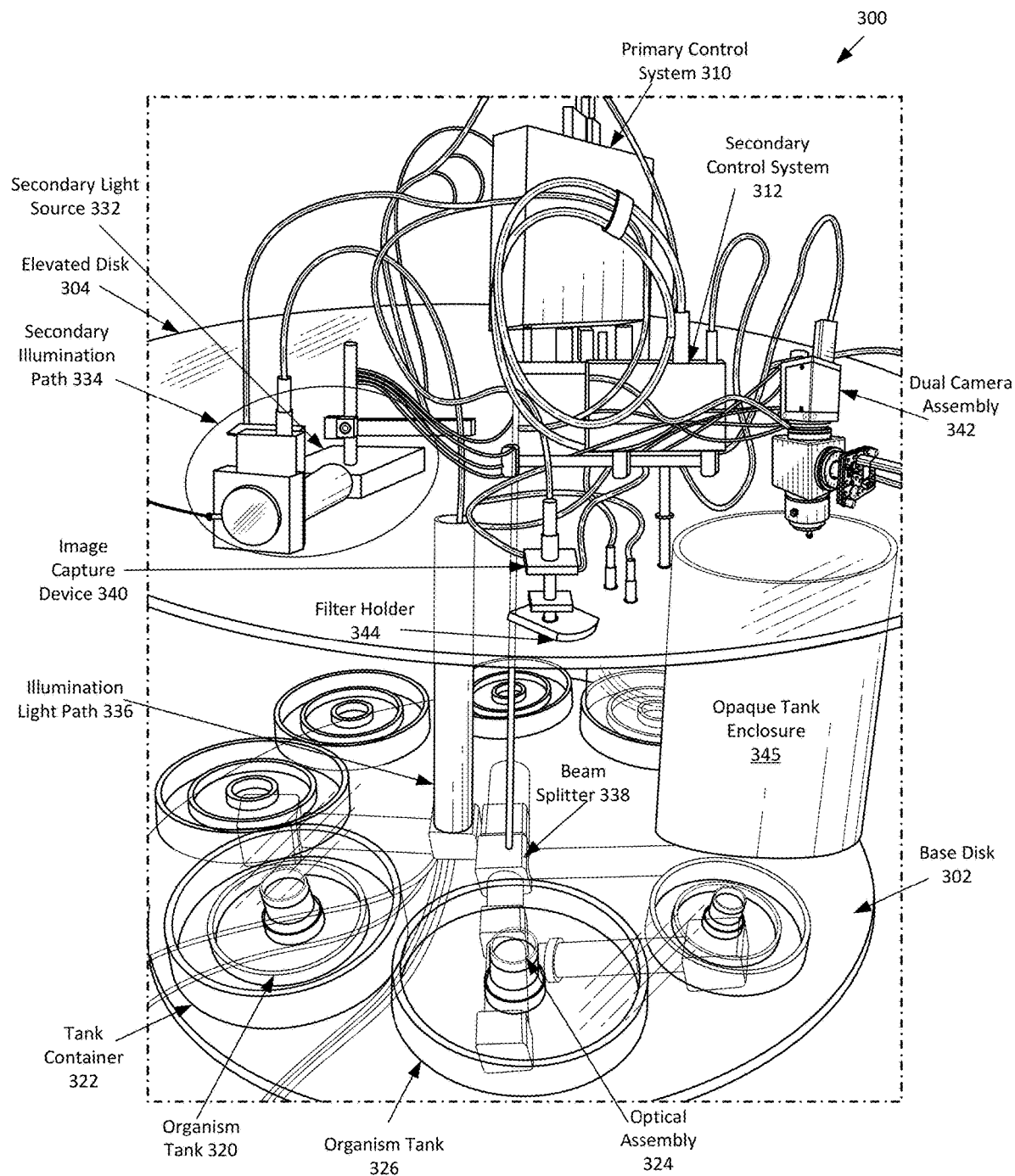
FIG. 3A depicts a view of the hardware system from FIG. 1 from a ¾ view according to some embodiments.

FIG. 3A depicts a view 300 of the hardware system from FIG. 2 from a ¾ view according to some embodiments. View 300 includes a base disk 302 below an elevated disk 304. The base disk 302 may support multiple organism tanks, such as an organism tank 320 (individually, the organism tank 320, collectively, the organism tanks 320), multiple tank containers, such as a tank container 322 (individually, the tank container 322, collectively, the tank containers 322), and multiple tank illuminators held by an optical assembly 324, beam splitting assembly 338, and an opaque tank enclosure 345.

In one example configuration, the elevated disk 304 supports a primary control system 310, a secondary control system 312, a beam splitter 346 (depicted in FIG. 3B), a secondary illumination path 334, an illumination light path 336, an image capture device 340, a dual-camera assembly 342, and filter holder 344. In this example, it will be appreciated that any number of devices are optional depending on the need and functionality required.

The base disk 302 (e.g., first platform 102 of FIG. 1) and the elevated disk 304 (e.g., second platform 104 of FIG. 1) may be fabricated using materials such as aluminum, acrylic, FEP, HDPE, PTFE, PVC, or ABS. In various embodiments, there are holes in the elevated disk 304. An image capture device may be fitted to the hole. This allows for camera alignment. In some embodiments, the elevated disk 304 is transparent. In some configurations, rather than holes being in the elevated disk 304, the image capture device 340, dual camera assembly 342 (which may hold components of the image capture device), or the like may capture images through the material of the elevated disk 304. In some embodiments, the elevated disk 304 may be partially or completely opaque and have cut-outs or support (e.g., windows) for illumination and/or images to be taken. Similarly, the base disk 302 may be transparent or opaque.

In various embodiments, the base disk 302 includes holes that allow illumination to pass through the base disk 302 and enables optical alignment. Each hole in the base disk 302 may be aligned with a hole in the elevated disk 304.

In some embodiments, the base disk 302 is transparent and allows illumination to pass through the material from below the base disk 302 through an organism tank 320 supported by the base disk 302. In some embodiments, the base disk 302 is all or partially opaque and includes portions that are transparent or are configured such that the light-emitting device(s) may pass through a hole or other opening within the base disk 302. In some embodiments, the base disk 302 and the elevated disk 304 may have any thickness (e.g., a few millimeters to 1 or 2 centimeters).

Although the base disk 302 and the elevated disk 304 are characterized as disks, they may be any shape (e.g., circular, oval, square, or the like). In various embodiments, the base disk 302 and the elevated disk 304 have different shapes from each other (e.g., the base disk 302 may be round and the elevated disk 304 may be square) and/or have different dimensions. Similarly, the base disk 302 and the elevated disk 304 may have other properties (e.g., the base disk 302 may be opaque with holes to allow for illumination through the base disk 302, while the elevated disk 304 may be all or partially transparent).

In some embodiments, the base disk 302 supports multiple tanks, such as the organism tank 320. One or more organism tanks may be positioned within the tank container 322.

The organism tanks 320 may be positioned on the base disk 302 in a symmetrical, rotational or circular pattern. In some embodiments, the base disk 302 supports eight organism tank 320, each with one tank placed in a symmetrical, circular pattern. In some embodiments, the organism tank may be enclosed by the tank container 322, such as the organism tank 320, which is enclosed by the tank container 322. In some embodiments, an organism tank 326 is not enclosed by a corresponding tank container. The base disk 302 may support any number of tank containers 322 and organism tanks 320.

In some embodiments, base disk 302 includes a number of organism tanks 320 and tank containers 322. The tank container 322 allows the organism tanks and tank containers to be placed in a symmetrical, circular pattern. As discussed herein, compactness of the hardware system 100 may allow a benchtop vibration isolation platform to insulate the system from external vibrations. Furthermore, the rotational symmetry allows for add-on components of the hardware system 100, such as light stimulation, noise stimulation, or water recirculation, to be synchronized, to be implemented in a tank-level or system-level rotational symmetry.

In some embodiments, an optional ground disk may be placed under the base disk 302 to hold or sandwich elements of the illumination light path, such as the beam splitting assembly, in place. In one embodiment, an optional sub-base disk (not shown) may be placed under the base disk 302 when elements of the illumination light path, such as the light source, beam expander, and beam splitting assembly, are standalone units that are separate from the hardware system 100. In some embodiments, a center support may be used to align one or more of the base disk 302, the optional sub-base disk, and the elevated disk 304.

The elevated disk 304 may include any number of holes (e.g., eight) arranged in a symmetrical manner. In one example, each of the multiple holes may have a diameter of 25.4 mm. The centers of the tank containers 322 may be aligned with one of the holes. In some embodiments, image capture devices and components which provide illumination to the hardware system 100 may be placed (e.g., screwed) into holes of the elevated disk 304. In some embodiments, the elevated disk 304 is transparent and does not include holes. The image capture devices may be fixed on the elevated disk 304, and the lens pointed downward to record digital images and/or video of a corresponding tank.

Components that provide illumination to the hardware system 100 may include a light source such as secondary light source 332. The placement of the elevated disk 304 may also allow for heat from the organism tanks 320 to dissipate (e.g., with minimal impact on the rest of the hardware system 100).

In some embodiments, the hardware system 100 includes a support that runs between the base disk 302 and the elevated disk 304. The support may support the base disk 302 and the elevated disk 304 in place. In some embodiments, a service conduit 106 may be placed at one of the service ports of the hardware system 100. The service conduit 106 may, in some embodiments, provide a mechanism to organize power cables or ethernet cables. In various embodiments, the service conduit 106 provides protection to the beam provided by the beam expander.

The primary control system 310 may manage the hardware system 100. The primary control system 310 may provide control signals and data to control the image capture devices, cache digital images, cache digital video captured by the image capture devices, and transfer the digital images and digital video from cache to storage (e.g., a network-attached redundant array of independent disk (RAID) storage). In some embodiments, the primary control system 310 synchronizes illumination and control projectors and any additional experiment equipment such as remote-controlled tap actuators, tank door openers, such as the gates or doors of the epsilon maze, as seen in FIG. 21. The primary control system 310 may delegate some control and processing tasks to one or several secondary computers, such as the secondary control system 312. In some embodiments, the primary control system 310 may utilize a wired internet connection (as opposed to a wireless internet connection) via Ethernet to a local area network (LAN) and receive power via a power cable. The secondary control systems 312 may be optional.

In various embodiments, the secondary control system 312 is a single-board computer that is used to control a dual-camera recording setup or a pico-projector to reduce the computation load on the primary control system 310. In one configuration, the secondary control system 312 also utilizes a wired internet connection via Ethernet to the LAN. In some embodiments, the secondary control system 312 is a Raspberry Pi.

The primary control system 310 and/or the secondary control system 312 may control any number of image capture devices to take images of any number of organism tanks. Images from the different image capture devices may be taken simultaneously or at any time. The primary control system 310 and/or the secondary control system 312 may receive and/or store the images received by the image capture device(s) at any time.

The organism tank 320 may include a single well, in which the aquatic organisms, or experimental subjects, may have access to the entire volume of the organism tank 320 filled with water or another liquid. In one embodiment, the organism tank 320 may include multiple wells where each of the wells may contain one or more aquatic organisms. An example of wells can be seen in FIG. 19A, which depicts different configurations of wells for different organism tanks 320. The wells may be placed or removed from one of the tank containers 322 of the base disk 302. Each of multiple wells in an example organism tank 1940 of FIG. 19A may have substantially the same volume.

There may be different sizes of organism tank 320. In some embodiments, the organism tank 320 may be as large as the tank container 322. An example of an organism tank that is as large as tank container 322 is organism tank 326.

Each of the organism tanks 320 may be filled with water, and aquatic organisms may be placed within the organism tanks 320, illuminated by the optical assembly 324 and imaged by one of the multiple image capture devices 340. In some embodiments, the aquatic organisms are macro-organisms, such as zebrafish larvae. The volume of the organism tank 320 determines a maximum size of aquatic organisms that the tank enclosure can sustain. For example, a cylindrical tank enclosure of a size suitable for adult zebrafish may require a water column 10 cm in height.

Each of the organism tanks 320 may be placed within tank container 322. The tank container 322 may provide a place to anchor or thread the optical assembly 324 and the organism tank 320. A user of the hardware system 100 may switch out one or more of the organism tanks or optical assembly 324 from a particular tank container 322, allowing for support for interchangeable plug-and-play components. For example, the user may replace one tank illuminator with a different tank illuminator. This may be accomplished, in some embodiments, without disturbing the aquatic organisms in the organism tank 320.

In some embodiments, the tank container 322 may include a circular base with a diameter of 15 cm with a threaded hold in the center with a diameter of 25.4 mm. In one example, tank container 322 includes an outer cylindrical wall with a height of 20 mm and an outer diameter of 15 cm and an inner cylindrical wall with a height of 31 mm and an inner diameter of 25.4 mm. In some embodiments, the top and the bottom part of the inner cylindrical wall may be threaded. The threads at the bottom may be used for coupling the tank illuminator holder to the tank container. The threads at the top may be used for coupling the tank illuminator to the tank illuminator holder. In various embodiments, the inner and outer cylindrical walls may have different diameter and height measurements. Tank container 322 may provide a thermal buffer to the organism tank 320.

In some embodiments, the optical assembly 324 holds a tank illuminator that includes a cone mirror that transforms incident, vertical light from the light source 330 to a horizontal, rotationally symmetrical light field. In some embodiments, the optical assembly 324 includes a 45° reflective cone that contains a metal mirror. In one embodiment, the optical assembly 324 is an acrylic cylinder with one end machined as an inside-pointing, 45° reflective cone that acts as a second surface mirror when illuminated from the other end of the cylinder. As the 45° cone angle produces total internal reflections for internal rays parallel to the cylinder axis, the cylinder effectively acts as a second surface mirror to incident light entering the other, flat end in a direction parallel to its axis.

In some embodiments, a secondary light source provides ambient visible light from a visible, NIR-free light source, such as standard LED. In some embodiments, the beam splitter 346 may direct illumination from the pico-projector 370. The standard LED may be a wide spectrum LED, emitting electromagnetic energy within the wavelength range of 475 nm to 725 nm. In some embodiments, the ambient light from the environment in which the hardware system 100 is operated enters the system through the elevated disk 304. Depending on the ambient light spectrum, the images obtained by the apparatus may not be impacted, even if a tank enclosure is not used.

In various embodiments, the secondary illumination path 334 connects to the pico-projector 370 to project a scene onto the organism tank 320. In some embodiments, the secondary illumination path 334 includes a dichroic mirror which is held in place on the elevated disk 304 by a dichroic prism holder.

In some embodiments, the illumination light path 336 connects to a single, coherent light source distributed to multiple organism tanks and tank containers positioned in a circle centered at the center of the base disk 302 of the hardware system 100. The illumination light path 336 connects a primary light source 330 (shown in FIG. 3B), a beam expander 339 (shown in FIG. 3B), and a beam splitting assembly 338.

For example, the beam splitting assembly 338 splits electromagnetic energy, or light, from the primary light source 330 into multiple beams. By using a beam-splitting assembly, properties or attributes, such as an arrival time at the organism tank 320 associated with each beam or light intensity of each beam in the beam splitting assembly, may be substantially the same. In various embodiments, beams of light split by the beam splitting assembly 338 may have properties similar to the primary light source 330, such as the wavelength of light, light intensity, phase, and degree of polarization. Different beams may be combined, filtered, or split in other embodiments to create beams with different properties (e.g., two beams may have different wavelengths).

In some embodiments, the number of beam splitters in the beam splitting assembly 338 used in the hardware system 100 is a number that is a power of two minus 1, such as 1, 3, 7, etc. The beam splitting assembly 338 may include multiple prisms, lenses, and mirrors arranged in a particular configuration to divide a single light source into multiple beams of light. In some embodiments, the end of the illumination light path is the optical assembly 324. There may be any number of beam splitters. The beam splitting assembly 338 may include one or more prisms, lenses, and/or mirrors.

In one embodiment, the image capture device 340 is a digital camera capable of capturing digital images and/or digital video. The image capture device 340 is an imaging sensor that captures one or more images of a scene in a snapshot or longer exposure setting in the form of a data stream (an image stream, a pixel stream, byte stream, or the like). The image capture device 340 is driven by the primary control system 310. In some embodiments, one or more of the image capture devices 340 is positioned below or substantially below one of the organism tanks 320.

In various embodiments, the dual-camera assembly 342 includes two image capture devices capable of capturing different images of the same scene at possibly different exposure time, magnification, resolution, and wavelength. The dual camera assembly 342 further includes a prism that splits an incoming light beam with an intensity ratio. The intensity ratio, which determines the amount of light each image capture device of the dual camera assembly 342 receives, also determines the exposure times usable by each of the image capture devices. For example, the prism may split the incoming light beam to a 90%/10% intensity ratio, with one image capture device receiving 90% of the incoming light, while another image capture device is receiving 10% of the incoming light. One image capture device may receive approximately ten times as much light as the other image capture device. In some embodiments, the different image capture devices may record images using different exposure times. For example, one image capture device may use an exposure time that is ten times shorter than the other image capture device. An example of one dual-camera setup can be seen in FIG. 5, which depicts an example dual-camera setup capable of capturing images at two different exposure times. Another example of a dual-camera setup can be seen in FIG. 6, which depicts another dual-camera setup capable of capturing NIR and full-spectrum images at two different focal lengths. Further details regarding the dual-camera setups will be described in FIG. 5 and FIG. 6.

In some embodiments, the filter holder 344 holds one or more filters that may be used on image capture devices of the hardware system 100, such as the filter of the dual camera assembly 342.

In some embodiments, the opaque tank enclosure 345 may be built of a material that filters out certain wavelengths, such as visible light, from the organism tank 320. In some embodiments, the opaque tank enclosure 345 may be composed of aluminum, mylar, or black-colored paper.

Figure 3B:
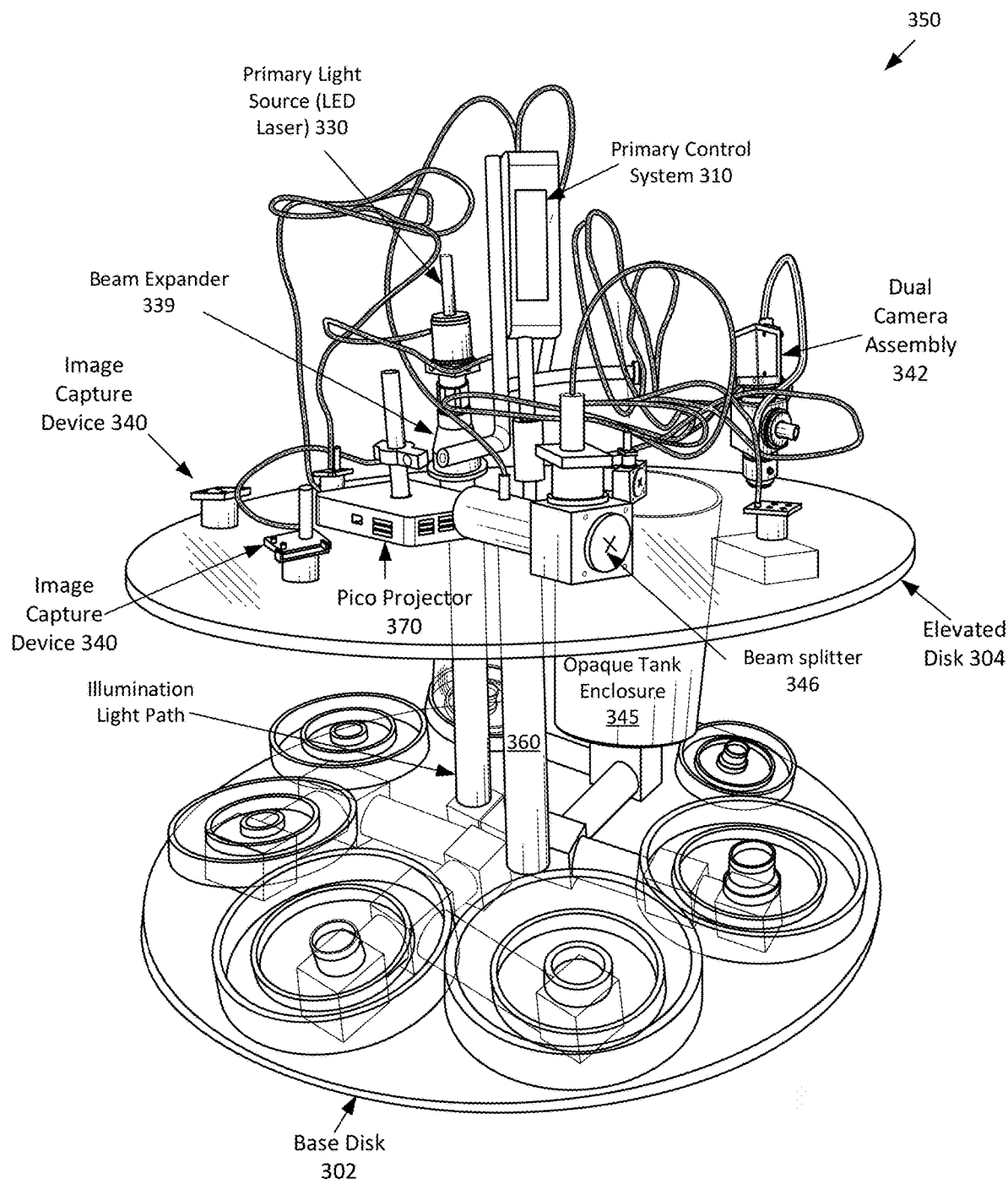
FIG. 3B depicts a different configuration of the hardware system from FIG. 1 from another side view according to some embodiments.

FIG. 3B depicts a view 350 of a different configuration of the hardware system from FIG. 2 and FIG. 3A from another side view according to some embodiments. View 350 shares many elements depicted in FIG. 3A, including the base disk 302, the elevated disk 304, the primary control system 310, the secondary control system, the image capture device 340, the dual camera assembly 342, and the opaque tank enclosure 345. View 350 includes components of the hardware system 100, such as a primary light source 330, a beam expander 339, and a pico-projector 370.

In one embodiment, the primary light source 330 is a laser that generates a beam of light that travels along the illumination light path. In some embodiments, the primary light source 330 provides illumination from a narrow spectrum, coherent, NIR light source. For example, the primary light source 330 may emit light with a wavelength between 808 to 810 nanometer (nm), 850 nm, or 975 nm. In various embodiments, the primary light source 330 may be a vertical-cavity surface-emitting laser (VCSEL).

It will be appreciated that the primary light source 330 may be any light source, including a laser, a light-emitting diode, or other sources of light that is collimated or may be collimated using a lens. In various embodiments, the primary light source 330 emits light in any number of wavelengths.

In some embodiments, the primary light source 330 of a hardware system with eight tank containers may have an average power of 0.9 milliwatts (mW). In one embodiment, the average power of the primary light source 330 is at least one order of magnitude larger than a power of a corresponding wavelength in the secondary light source. The greater order of magnitude difference may be implemented by optically insulating the hardware system 100 using a transparent shielding material opaque to the wavelength of the primary light source 330, such as NIR.

In various embodiments, the pico-projector 370 is used to light along an illumination path. For example, the pico-projector 370 may be used to project rotating patterns of light concentric with the tank enclosure to induce the aquatic organism to move in a particular manner.

A support column or rod may provide structural support for the base disk 302 and the elevated disk 304. In some embodiments, the service conduit 106 provides a mechanism to organize power cables and the like that runs between the base disk 302, the elevated disk 304, and an environment outside the hardware system 100. In various embodiments, the service conduit 106 provides protection to the beam provided by the beam expander 339.

In some embodiments, elevated disk 304 may be flipped upside down and positioned under base disk 302, the mirror ports of the illumination paths replaced by beam-splitting prisms to transmit illumination from the illumination source and images to the capture device, and the lens assembly of the upward-facing capture devices modified accordingly, for example by fitting an axicon, so that the capture devices are not blinded by the illumination laser beam. In some embodiments with such configuration, organism tanks 320 are kept open so that a user can operate unconstrained over the organism tanks; for example, a user could perform direct observation of the organisms in the organism tanks or perform manual or primary or secondary controller system driven stimulation, such as manually touching aquatic organisms with a bristle or performing optogenetic stimulation with a separate, dedicated laser positioned above the organism tank(s).

Figure 4:
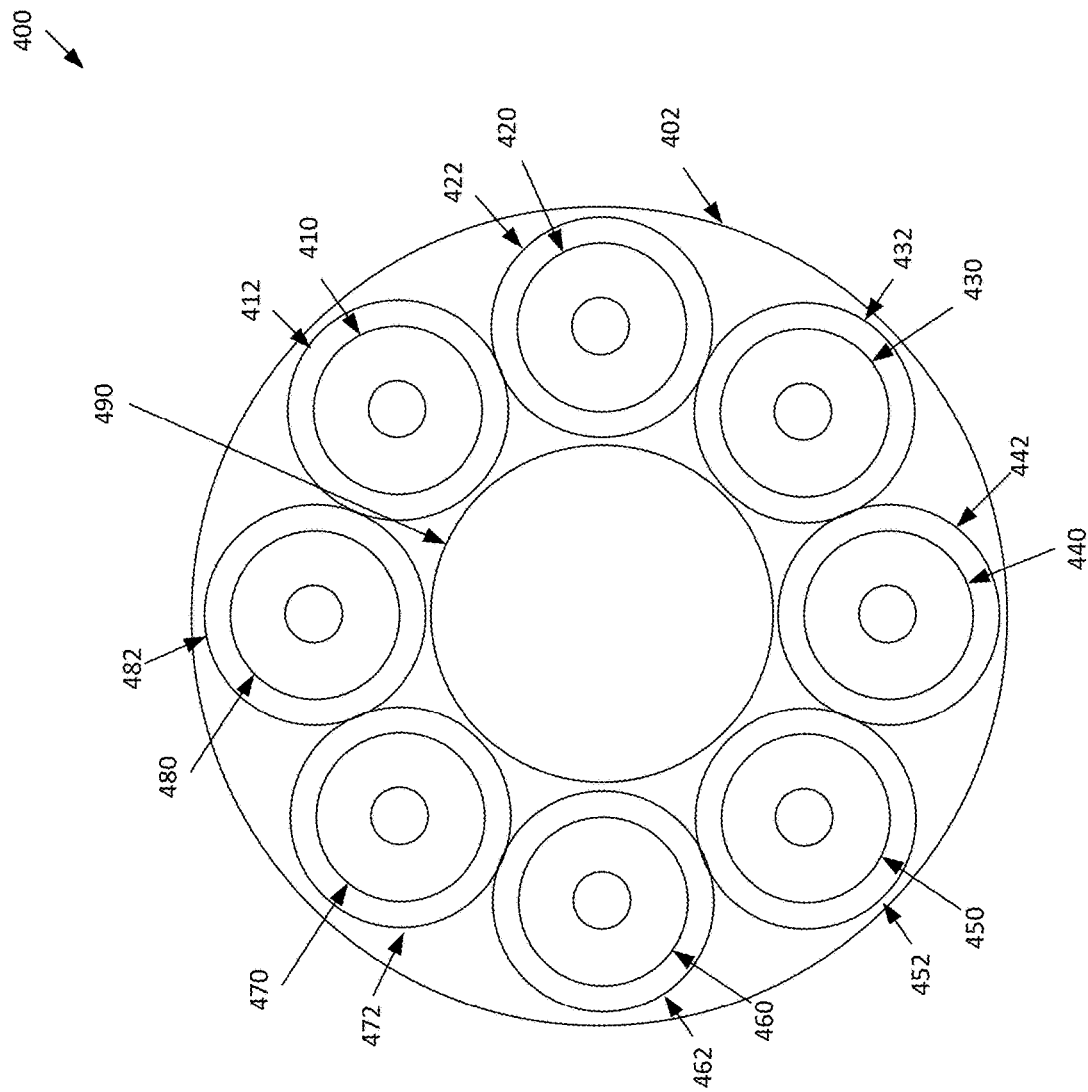
FIG. 4 depicts one configuration of multiple tank containers and tanks according to some embodiments.

FIG. 4 depicts a configuration 400 of multiple organism tanks according to some embodiments. The configuration 400 includes eight organism tanks 410, 420, 430, 440, 450, 460, 470, and 480 and eight tank containers 412, 422, 432, 442, 452, 462, 472, and 482. In the illustrated embodiment, each of the multiple organism tanks is surrounded by one tank container. In some embodiments, the number of tank containers and the number of organism tanks are not equal. In one configuration of tank containers, each of the multiple organism tanks are spatially isolated from one another. In one embodiment, the configuration of organism tanks of the hardware system 100 may include some or all of the multiple organism tanks being interconnected. An example of this configuration can be found in FIG. 23.

In some embodiments, configuration 400 further includes a central cylinder 490, which allows the base disk 402 to support an elevated disk (not shown). The central cylinder may provide thermal insulation and/or allow passive, noise-free water recirculation. In this configuration of the hardware system, the support column may be removed. Furthermore, service ports (not shown in FIG. 4) may provide a mechanism for power cables or ethernet cables to run from the elevated disk to the base disk, and/or input light ports that receive light from the beam expander may be moved to an area outside the central cylinder 490.

Figure 5:
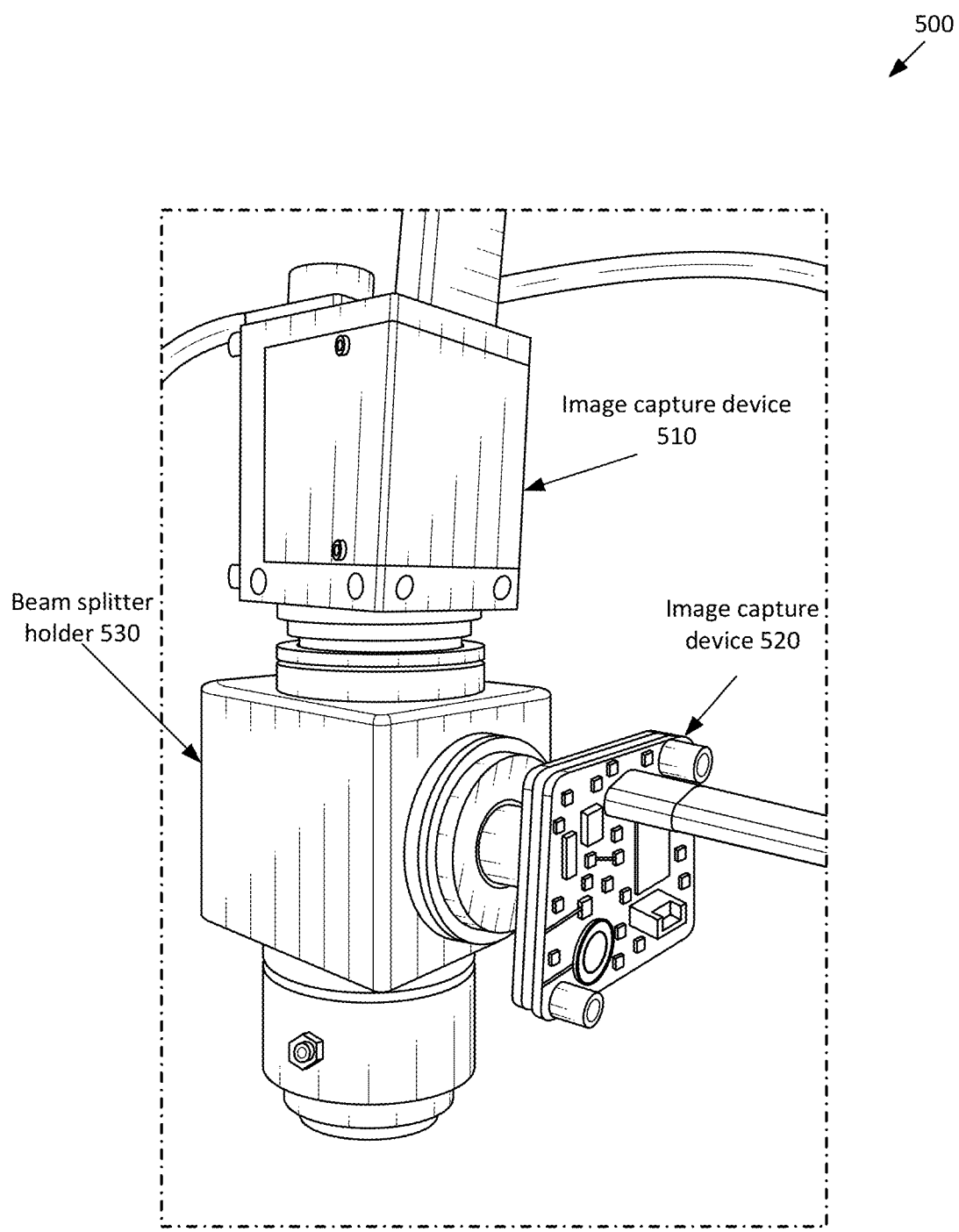
FIG. 5 depicts an example dual-camera setup capable of capturing long exposure and snapshot imaging according to some embodiments.

FIG. 5 depicts a dual-camera setup 500 capable of capturing images at two different exposure times according to some embodiments. The dual-camera setup 500 may include an image capture device 510, an image capture device 520, and a beam splitter holder 530.

In some embodiments, the image capture device 510 can include a red green blue (RGB) camera, high-dynamic-range (HDR) camera, video cameras, and/or the like. In some implementations, the image capture device 510 can include a camera with a lens that provides a relatively standard field-of-view (e.g., around 75°). In other implementations, the image capture device 510 can include cameras with lenses that provide a relatively wide field of view (e.g., from around 120° up to 360°), such as a fisheye lens. The primary control system may utilize off-the-shelf video capture devices.

The image capture devices may support a remanent imaging mode. In remanent imaging mode, for example, for a given frame rate, a sensor may be configured to record in global shutter mode (e.g., as opposed to a sensor recording in rolling) with an exposure time of a value that results in recording consecutive frames with a negligible inter-frame time interval. This may be achieved by setting the sensor exposure time to the longest value consistent with the frame rate; for example, when recording at 30 fps, each image in a remanent imaging sequence would be exposed at ⅟30 s. In practice, the sensor of a video capture device needs some time to refresh between each exposure. For a given video capture device, the remanent exposure of that capture device at a given frame rate is defined as the longest exposure time that the capture device can support at that frame rate and produce a new image at each frame cycle; a capture device capturing at "remanent exposure" is said to operate in Remanent Imaging mode.

For a capture device supporting four frame rates ranging from 3.75 fps to 30 fps, typical examples of remanent imaging exposures might be 0.266 sat 3.75 fps, 0.133 sat 7.5 fps, 0.066 s at 15 fps, and 0.033 s at 30 fps. More generally, one may consider that a camera is operating in remanent imaging mode if it captures consecutive full frames (e.g., the camera operating in global shutter mode) with an amount of uncaptured interframe time no longer than the time required by the camera sensor to refresh.

In various embodiments, the image capture device 520 may capture one or more images of a scene in remanent imaging mode in the form of a data stream (an image stream, a pixel stream, byte stream, or the like). In many circumstances, remanent images are produced with exposure times that result in motion blur. In snapshot imaging, by contrast, exposure time is generally short enough to prevent such blur. The maximum duration of the exposure time may be determined by the speed of the fastest moving objects in the scene. Remanent Images result from the mathematical integration of the luminous power irradiating the sensor plane during the exposure interval. As the power irradiating the source originates from the power radiated by scene components, an image can also be interpreted as the projection on the sensor plane of the power radiated by scene components integrated over the exposure interval. As scene components move during the exposure time along the field lines of their velocity fields, images can also be interpreted as the projection of the velocity field resulting from integrating a time-varying velocity field over the exposure interval. Consistent with this interpretation, motion data can be extracted, not by the usual numerical processing performed on a sequence of snapshots, but by morphological algorithms and other algorithms capable of handling abstract mathematical objects; this type of processing is often referred to as symbolic processing. Remanent imaging algorithms are fundamentally different from all other motion extraction algorithms used in Snapshot Imaging as they work on a single image at a time; such image can be a native output of a camera or synthetically created by processing an image sequence. By nature, no sampling-based motion extraction algorithm can infer motion from a single time sample without being provided extraneous information.

In some embodiments, properly-rounded integer multiples of the remanent exposure can be used to approximate remanent imaging at a lower frame rate than the capture frame rate (or at frame rates not natively supported by the capture device), to reduce the amount of unexposed, interframe time. For example, for a sensor capturing at 60 fps, exposure durations of 0.066 s and 0.099 s could be used instead of the 0.016 s remanent exposure at 60 fps, though the select embodiments do not limit this. At 60 fps, an exposure time of 0.016 s may result in 0.04 s left unexposed every second, while using 0.066 s (the remanent exposure at 30 fps) or 0.099 s (the remanent exposure at 20 fps) may leave unexposed only 0.02 s every second. In some embodiments, operating frame rates of image capture devices should be understood as not necessarily dictating the usable exposure time.

The beam splitter holder 530 may include a beam-splitter prism that splits an incoming beam with an intensity ratio. The intensity ratio, which determines the amount of light each image capture device of the dual-camera setup 500 receives, also determines the exposure time of each of the image capture devices. As discussed herein, the prism may split the incoming light into different ratios of intensity (e.g., split an incoming light beam to a 90%/10% intensity ratio, with the image capture device 510 receiving 90% of the incoming light, while the image capture device 520 receives 10% of the incoming light. The digital image captured by image capture device 510 may have an exposure time that is ten times shorter than an exposure time of digital image captured by the image capture device 520.

Sequences of frames of digital images captured by the image capture device 510 may be temporarily buffered in a circular buffer while the aquatic control system analyzes images captured by the image capture device 520 through Remanent Imaging Processing.

Figure 6:
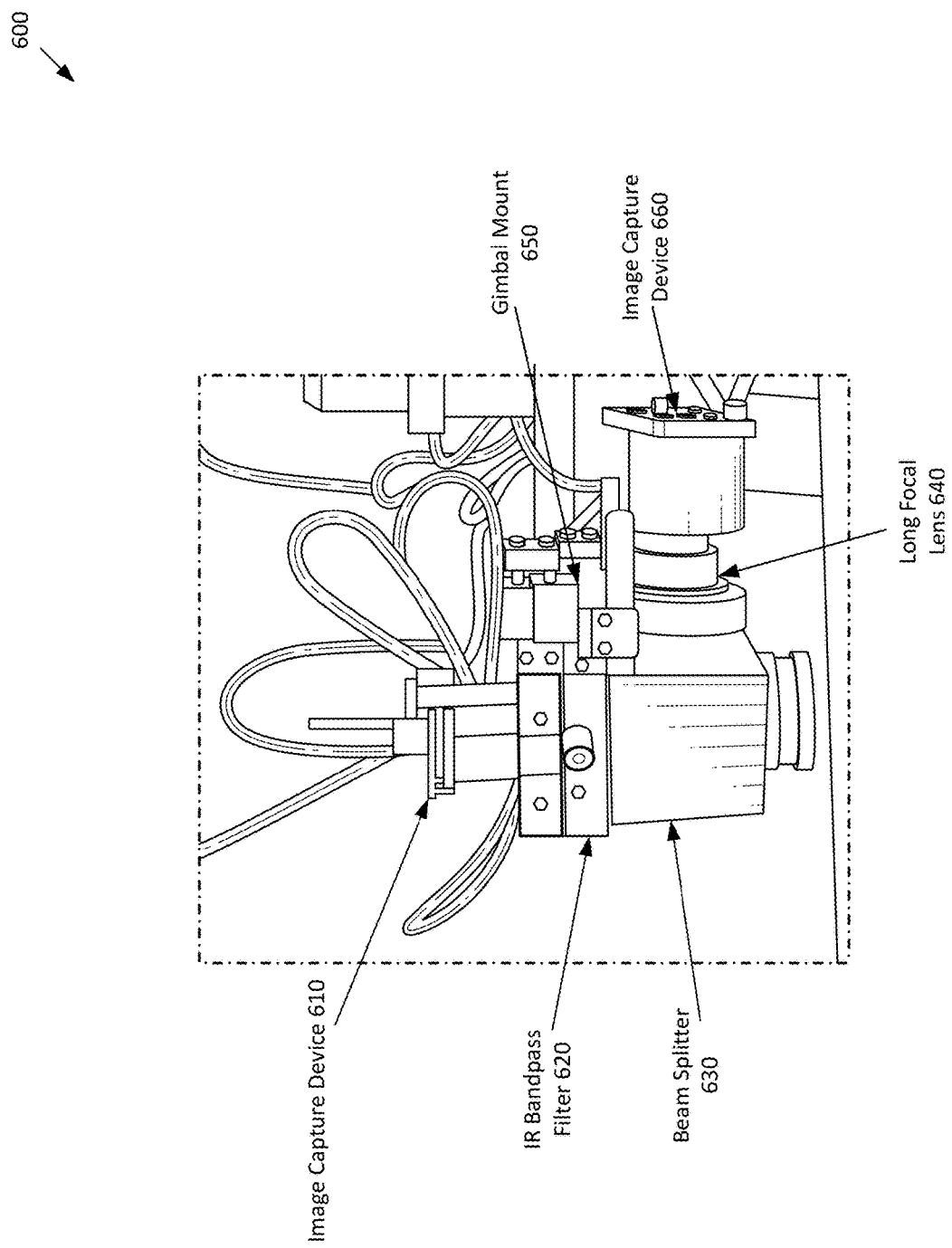
FIG. 6 depicts another example dual-camera setup capable of capturing near-infrared (NIR) and full-spectrum imaging according to some embodiments.

FIG. 6 depicts another example dual camera setup 600 capable of capturing NIR and full-spectrum imaging according to some embodiments. The dual-camera setup 600 includes an image capture device 610, an IR bandpass filter 620, a beam splitter 630, a long focal lens 640, a gimbal mount 650, and an image capture device 660. The dual-camera setup 600 depicts a dual camera capable of supporting simultaneous NIR and visible spectrum capture of digital images or video of an organism tank at two different magnification levels.

An example of digital images captured by the dual-camera setup 600 may be seen in FIG. 17. FIG. 17 depicts the entire organism tank 1710, including hatching chamber 1720. Image 1750 is an image of the hatching chamber 1720 at a magnification captured by the image capture device 660.

The organism tank 1710 of FIG. 17 includes a tank insert that partitions a single-well organism tank into the hatching chamber 1720 and the central area 1730. In some embodiments, the image capture device 610 captures remanent images.

In some embodiments, the organism tank may include mature organisms that move about the reservoir in the organism tank. The aquatic organism control system may perform an alignment of the image capture device 660 (e.g., using one or more servos) in real-time based on images captured by the image capture device 610. For example, the image capture device 610 may receive images, determine centering and/or alignment based on the images, then control the image capture device 660 (e.g., via software or hardware) for alignment. In some embodiments, the image capture device 660 may be aligned at any time, even if a tank or organism is moved. As such, the hardware system may automatically track and record an organism as it moves in the organism tank.

In some embodiments, the image capture device 660 images a smaller area of an organism tank at a magnification level that is higher than that of images captured by the image capture device 610. The long focal lens 640 of the image capture device 660 may support a higher magnification of images captured by the image capture device 660. Furthermore, the gimbal mount 650 coupled to the image capture device 660 may support fine-tuning of an angle of focus of the image capture device 660.

In some embodiments, a laser beam can be aimed at specific aquatic organisms in an organism tank using motorized or micro-electromechanical system (MEMS) mirrors. The motion of one or more aquatic organisms can be tracked using images from at least one image capture device in order to control the motorized or MEMS mirrors to follow the organism and to deliver a laser pulse when needed.

In various embodiments, image capture devices 660 are positioned on servo-controlled platforms to image one or more organism tanks from the other side, whether from below or from above. This arrangement may provide both primary illumination and imaging path on the same side of the floor disk. One application is brain imaging of living, swimming zebrafish using high resolution, high magnification cameras that are fitted on servo platforms that are controlled based on images recorded by a NIR camera. This approach can be used to image moving organisms in minute details. If needed, secondary laser light can be brought to excite the moving organism being imaged via laser vector projection.

Figure 7:
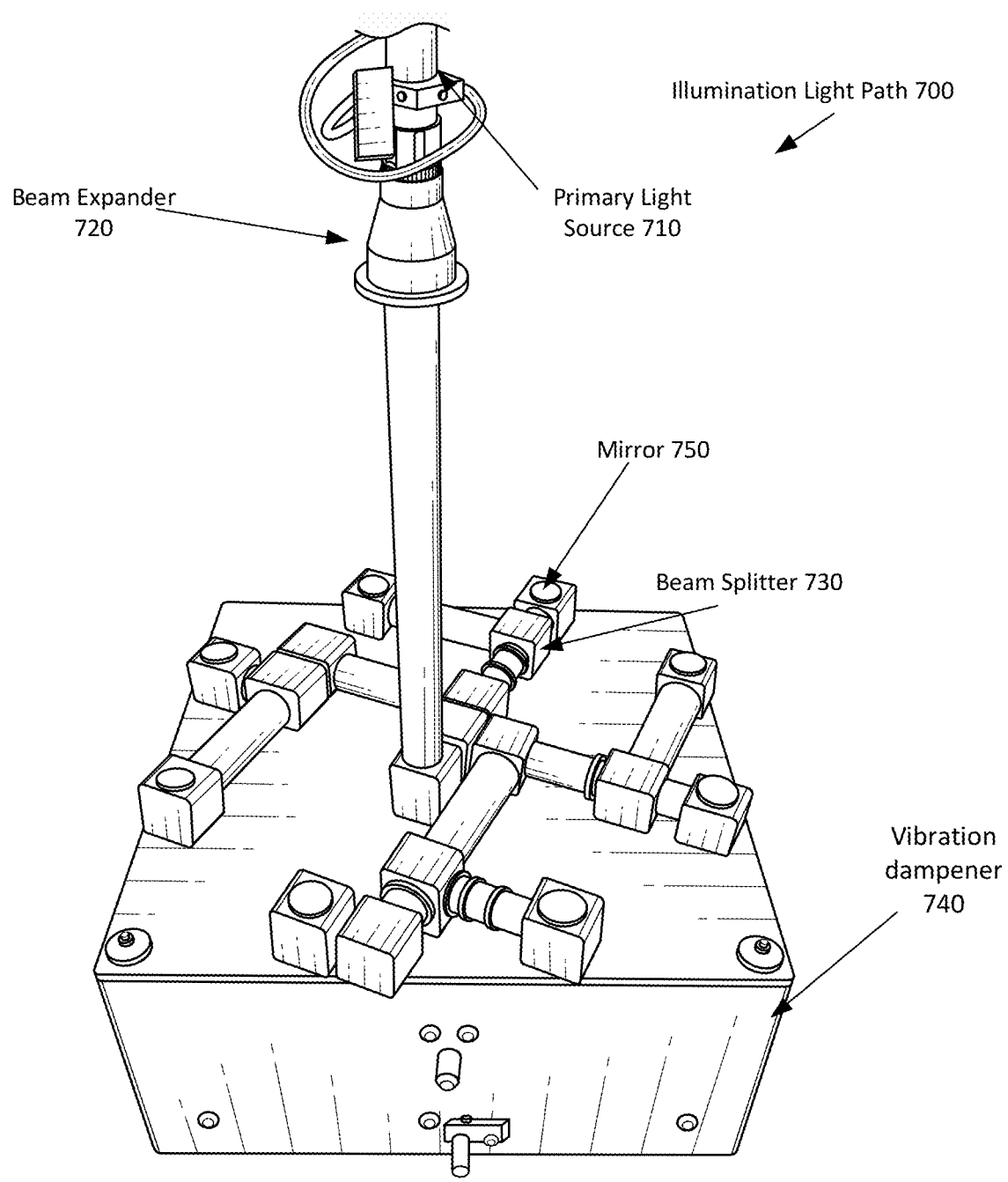
FIG. 7 depicts an illumination light path positioned on top of a vibration dampener according to some embodiments.

FIG. 7 depicts an illumination light path 700 positioned on top of a vibration dampener according to some embodiments. The illumination light path 700 includes a primary light source 710, a beam expander 720, a beam splitter 730, and a mirror 750. In the illustrated embodiment, the illumination light path 700 is positioned on top of an optional vibration dampener 740. In some embodiments, the beam splitting assembly may be arranged such that mirror ports are equidistant from each other and on a circle centered on a beam splitter adjacent to the mirror at the base of the illumination column.

In some embodiments, the primary light source 710 maintains a vertical alignment perpendicular to the planar surface of the base disk via the beam expander 720. The beam expander 720 may be placed or screwed into a hole in the elevated disk. The beam expander 720 receives a beam of light or electromagnetic radiation as an input and expands or reduces the size of the beam of light and outputs it. In some embodiments, the beam expander 720 utilizes multiple prisms to expand or reduce the beam of light from the primary light source 710.

A beam splitting assembly may split the expanded light from the beam expander 720 into multiple beams. In FIG. 7, there are seven beam splitters 730 depicted. There may be any number of beam splitters 730. The beam splitting assembly may be arranged to divide a single light source into multiple beams of light. In the illustrated embodiment of FIG. 7, each beam splitter 730 projects light to at least two mirrors 750. In some embodiments, one or more beam splitters or mirrors may project light upwards to tank illumination holders of organism tanks. By using a beam-splitting assembly, properties or attributes (e.g., such as light intensity at the organism tank 320) of each beam may be substantially the same. The illumination light path 700 terminates at the tank illuminator. More details regarding the beam splitting assembly will be described regarding FIG. 8A.

In some embodiments, the illumination light path 700 is positioned on top of the optional vibration dampener 740. The vibration dampener 740 may insulate the hardware system from external vibrations common to the environment of the hardware system. In some embodiments, the control systems, such as the primary control system or the secondary control system, may be removed from the elevated disk and placed on another surface that is not that elevated disk or the base disk. Other components of the hardware system may be electrically coupled to the primary control system or the secondary control system via a USB hub.

Figure 8A:
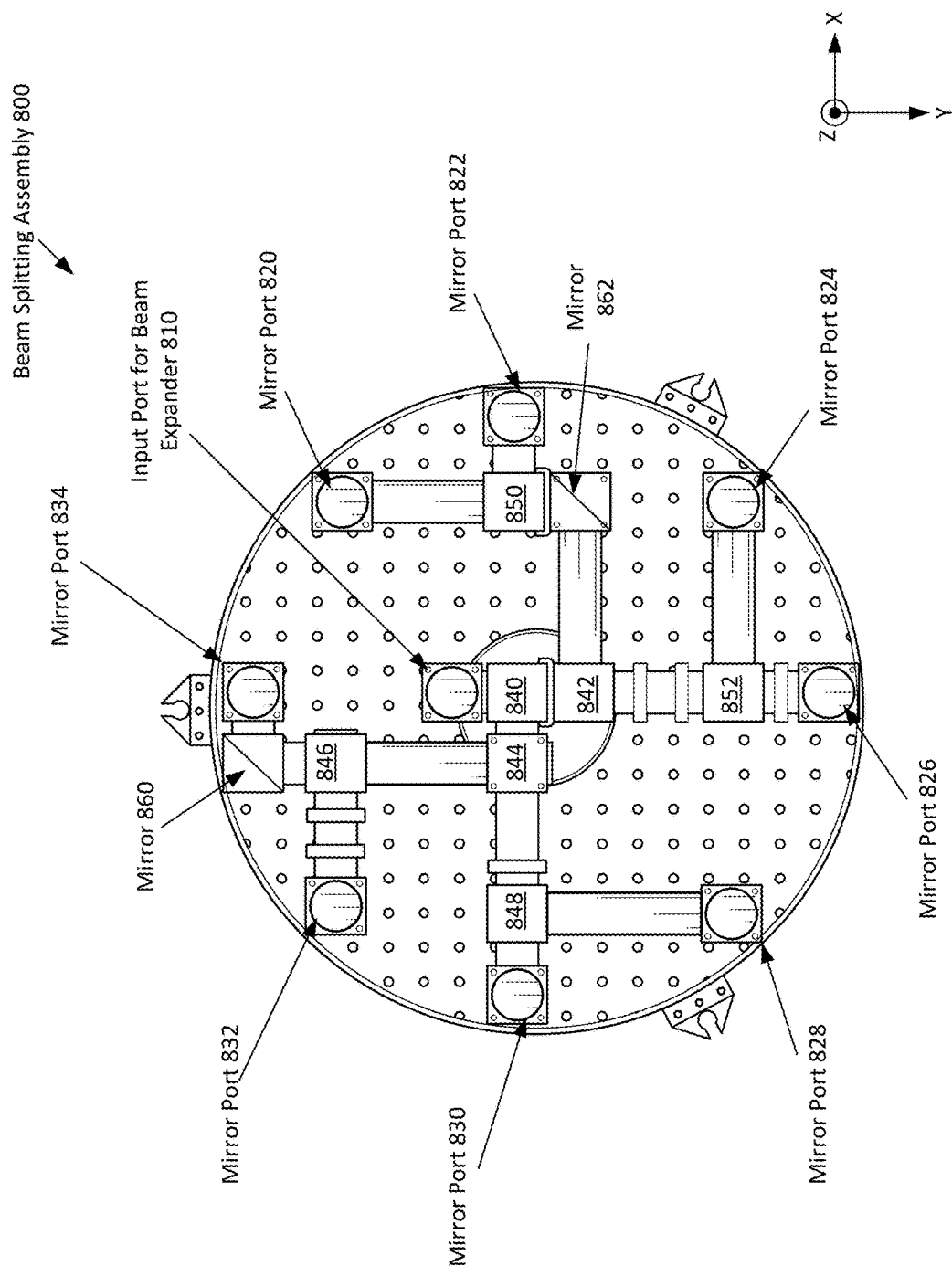
FIG. 8A depicts a top-down view of a beam splitting assembly placed on a platform of the example hardware system according to some embodiments.

FIG. 8A depicts a top-down view of a beam splitting assembly 800 placed on a platform of the example hardware system according to some embodiments. The beam splitting assembly 800 includes an input port 810, mirror ports 820, 822, 824, 826, 828, 830, 832, and 834, and beam splitters 840, 842, 844, 846, 848, 850, and 852. The input port 810 may receive light from the beam expander. In some embodiments, the input port 810 includes a mirror positioned at a 45° angle with the incoming light or laser beam. It should be noted that the incoming beam may be in a vertical position from below or from above or in a horizontal position when the primary light source and beam expander are positioned in the plane of the beam splitting assembly. The laser beam expanded may be split by the beam splitters 840, 842, 844, 846, 848, 850, and 852 to arrive at the mirror ports 820, 822, 824, 826, 828, 830, 832, and 834.

In some embodiments, each of the mirror ports 820, 822, 824, 826, 828, 830, 832, and 834 may include a mirror that faces in the Z-direction. In one embodiment, the number of output ports is 2N, where N is an integer. In some embodiments, the number of mirror ports is the same as the number of organism tanks. In one embodiment, the number of mirror ports is not the same as the number of organism tanks.

In various embodiments, each of the beam splitters 840, 842, 844, 846, 848, 850, and 852 are positioned to split the incoming light or laser beam into two orthogonal light beams of similar power. In some embodiments, the beam splitting assembly 800 further includes mirrors 860 and 862 so that the mirror ports 820, 822, 824, 826, 828, 830, 832, and 834 are on a common circle and equidistant from each other.

Figure 8B:
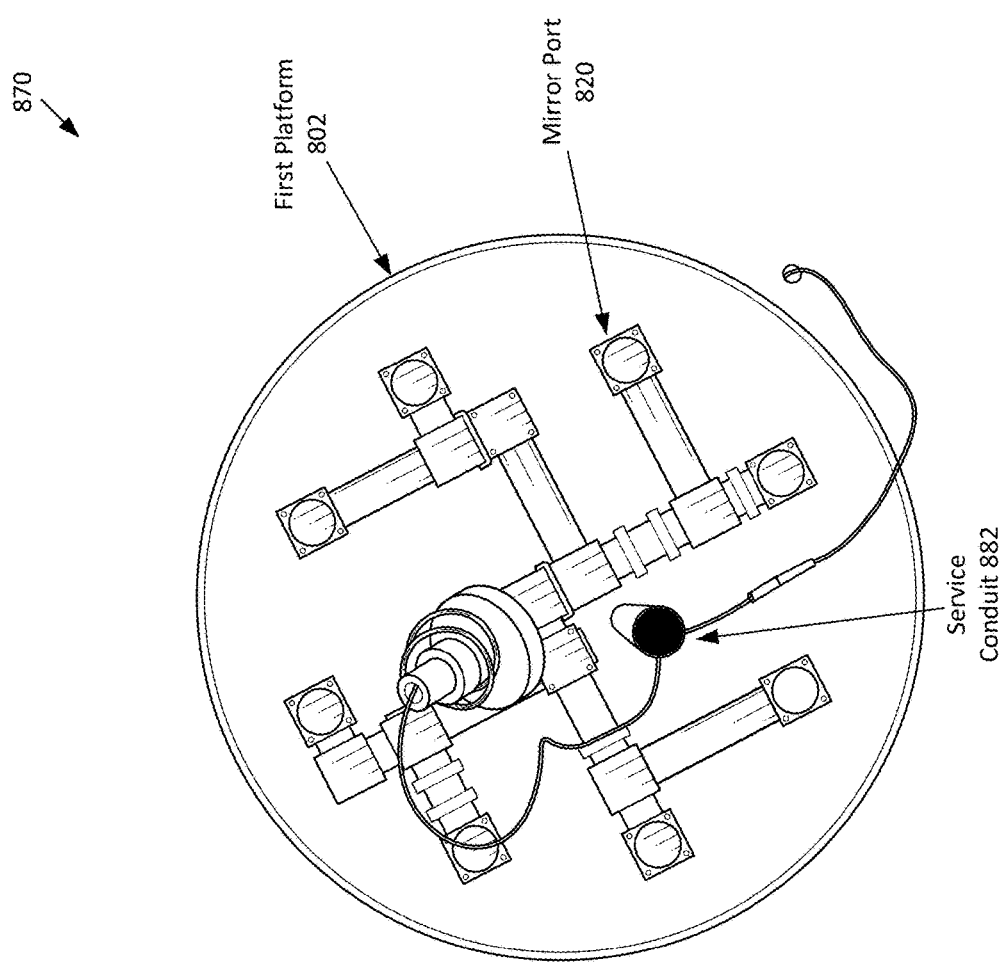
FIG. 8B depicts the illumination light path according to some embodiments.

FIG. 8B depicts an illumination light path 870 according to some embodiments. The illumination light path 870 includes many of the components depicted in FIG. 8A, including the mirror port 820. However, 870 includes other components not depicted in FIG. 8A including a first platform 802 and a service conduit 882 connected to a service port. In the illustrated embodiment, the first platform 802 may be above the illumination light path 870. In some embodiments, the first platform may support multiple organism tanks and tank containers (not shown in FIG. 8B). The service conduit 882 may provide an architecture for USB, power, or ethernet cables to connect the hardware system (e.g., on the elevated platform) to other devices or power sources outside of the hardware system 100 or to couple components on or below the first platform 802.

Figure 9:
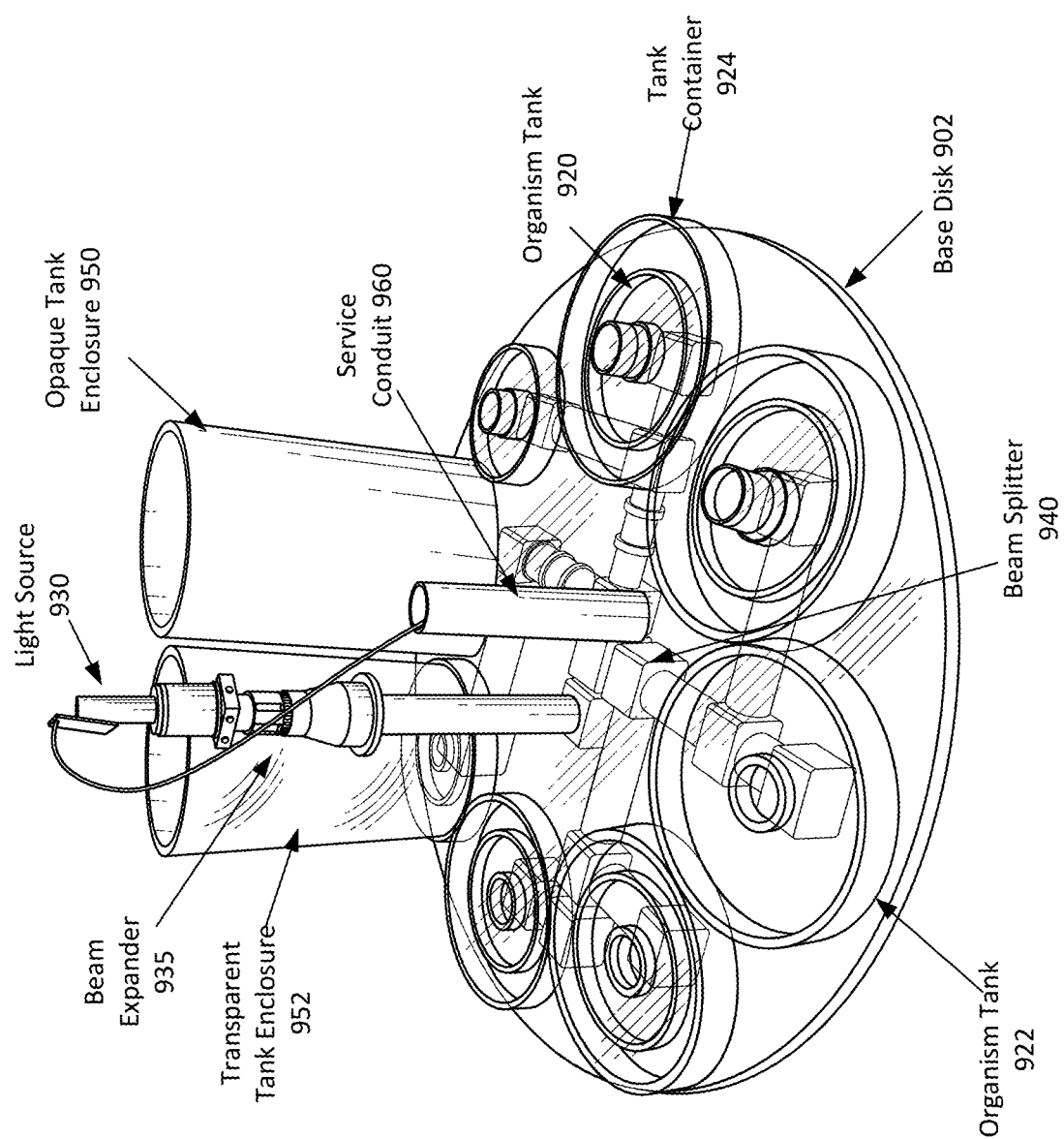
FIG. 9 depicts components of a lower platform of the example aquatic imaging system according to some embodiments.

FIG. 9 depicts components of a lower platform of the example aquatic imaging system according to some embodiments. The lower platform includes a base disk 902, which supports multiple organism tanks, including organism tanks 920 and 922, a tank container 924, a light source 930, a beam expander 935, a beam splitting assembly 940, an opaque tank enclosure 950, a transparent tank enclosure 952, and a service conduit 960.

The base disk supports multiple organism tanks, including organism tanks 920 and 922. The organism tanks may be positioned on the base disk 902 in a symmetrical, rotational or circular pattern. In some embodiments, the base disk 902 supports eight organism tanks, each with one tank placed in a symmetrical, circular pattern. In some embodiments, the organism tank 920 is enclosed by tank container 924. In one embodiment, the organism tank 922 is not enclosed by a corresponding tank container.

The illumination light path includes the light source 930, the beam expander 935, and the beam splitting assembly 940.

The opaque tank enclosure 950 may filter out certain wavelengths, such as visible light, from the organism tank. The opaque tank enclosure 950 may be closed on the top (e.g., by an elevated platform). In some embodiments, the opaque tank enclosure 950 may be composed of aluminum, mylar, or black-colored paper. In some embodiments, the opaque tank enclosure 950 may provide thermal insulation, noise insulation, and provide constant hygrometric conditions.

In various embodiments, the transparent tank enclosure 952 is composed of aluminum, poly (methyl methacrylate), polycarbonate, HDPE, PTFE, PVC, or ABS. In some embodiments, the transparent tank enclosure 952 may provide thermal insulation, noise insulation, and provide constant hygrometric conditions.

For example, the service conduit 960 may organize power cables or ethernet cables and the like that runs between the base disk, the elevated disk, and an environment outside the hardware system. In various embodiments, a service conduit 960 provides protection to the output of the beam expander of the illumination light path.

Figure 10:
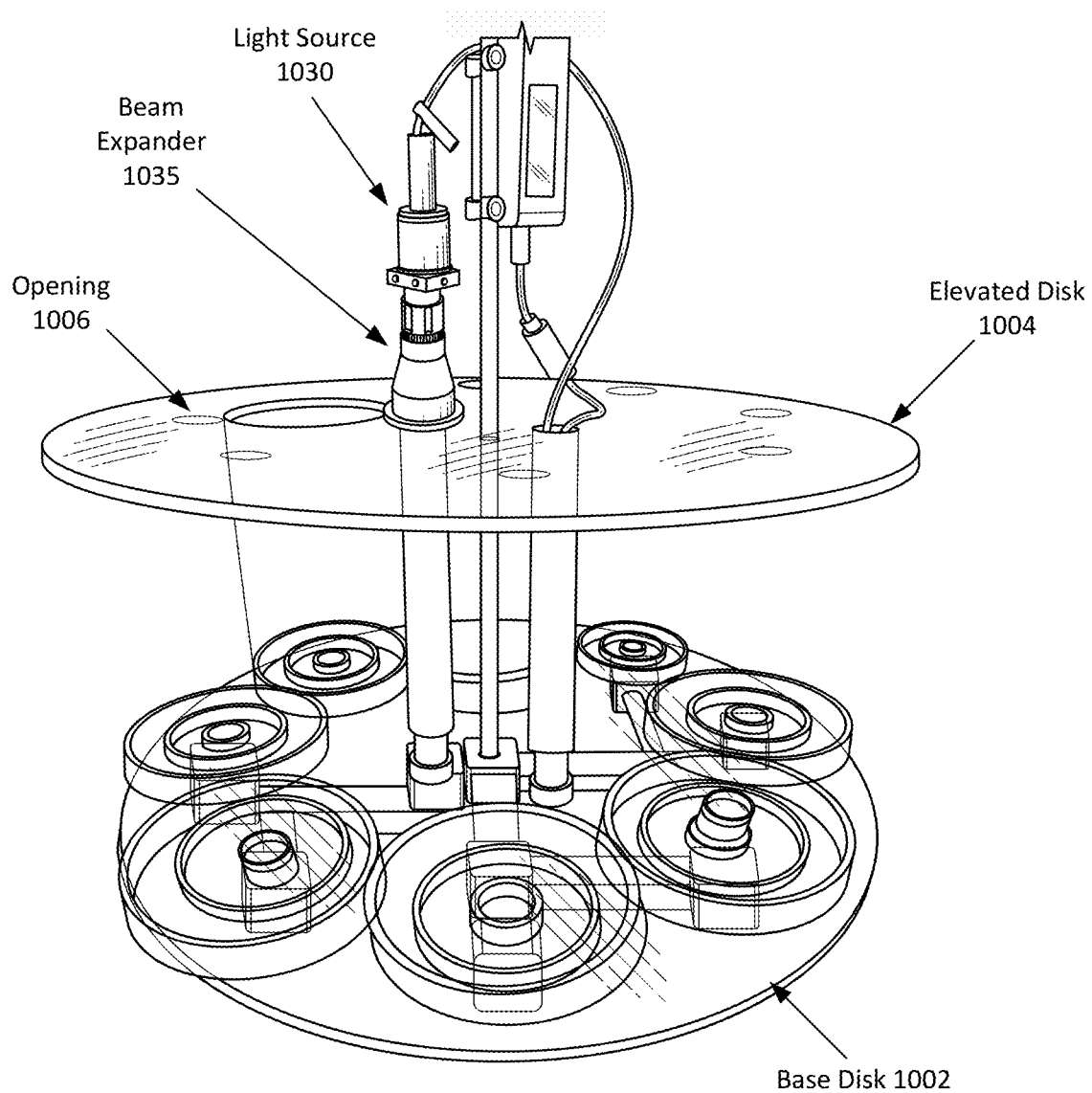
FIG. 10 depicts an upper platform of the example aquatic imaging system according to some embodiments.

FIG. 10 depicts an upper platform of the example aquatic imaging system according to some embodiments. The upper platform includes an elevated disk 1004, multiple openings, including an opening 1006, a light source 1030, and a beam expander 1035.

The elevated disk 1004 supports multiple components such as the light source 1030, the beam expander 1035, and a beam splitting assembly 1040. The illumination light path originates at the light source, such as a LED laser module, and terminates in the organism tank. In one embodiment, the opening 1006 may be centered on an organism tank and may enable the attachment of a digital device such as a camera. For example, the opening 1006 may be used to anchor and support one of the multiple image capture devices of the example aquatic imaging system. The image capture devices are fixed and point downwards towards a base disk 1002.

Figure 11:
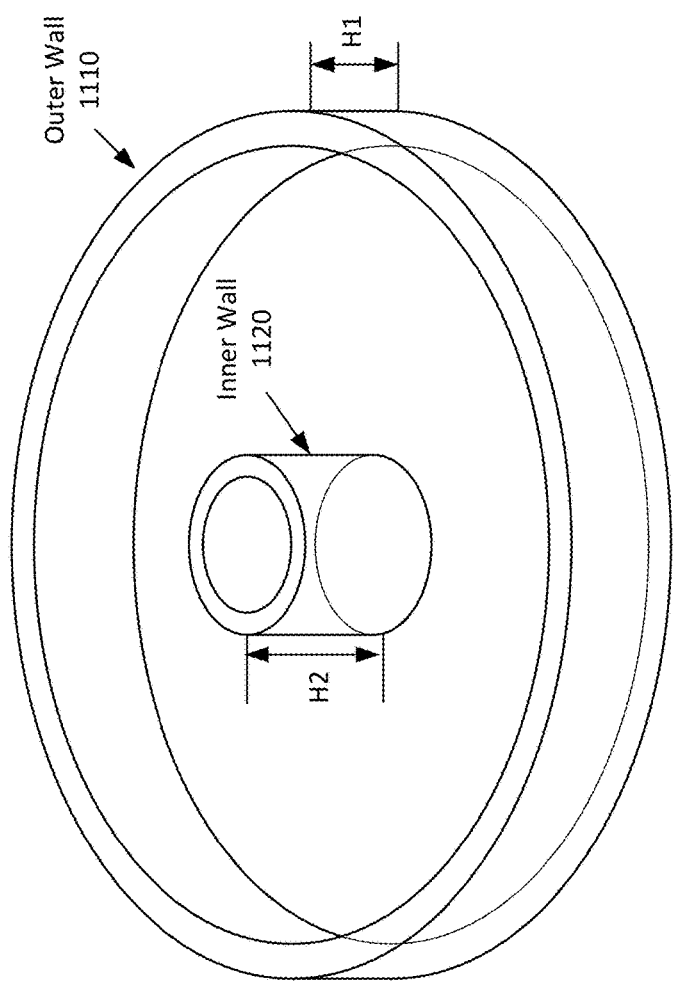
FIG. 11 depicts an example tank container according to some embodiments.

FIG. 11 depicts an example tank container 1100 according to some embodiments. In some embodiments, the tank container 1100 may be assembled by adhering two circular sections concentrically on a disk as depicted in FIG. 11. The tank container 1100 includes a center hole.

In some embodiments, the tank container 1100 may hold the organism tank. In one example, the tank container 1100 may include a base disk with a diameter of 15 cm with a threaded hole in the center with a diameter of 25.4 mm. The tank container 1100 may include an outer cylindrical wall 1110 with a height, H1, of 20 mm and an outer diameter of 15 cm and an inner cylindrical wall 1120 with a height, H2, of 31 mm and an inner diameter of 25.4 mm.

A tank container 1100 may be composed of materials chosen based on their refractive index close to that of water, such as FEP.

Figure 12A:
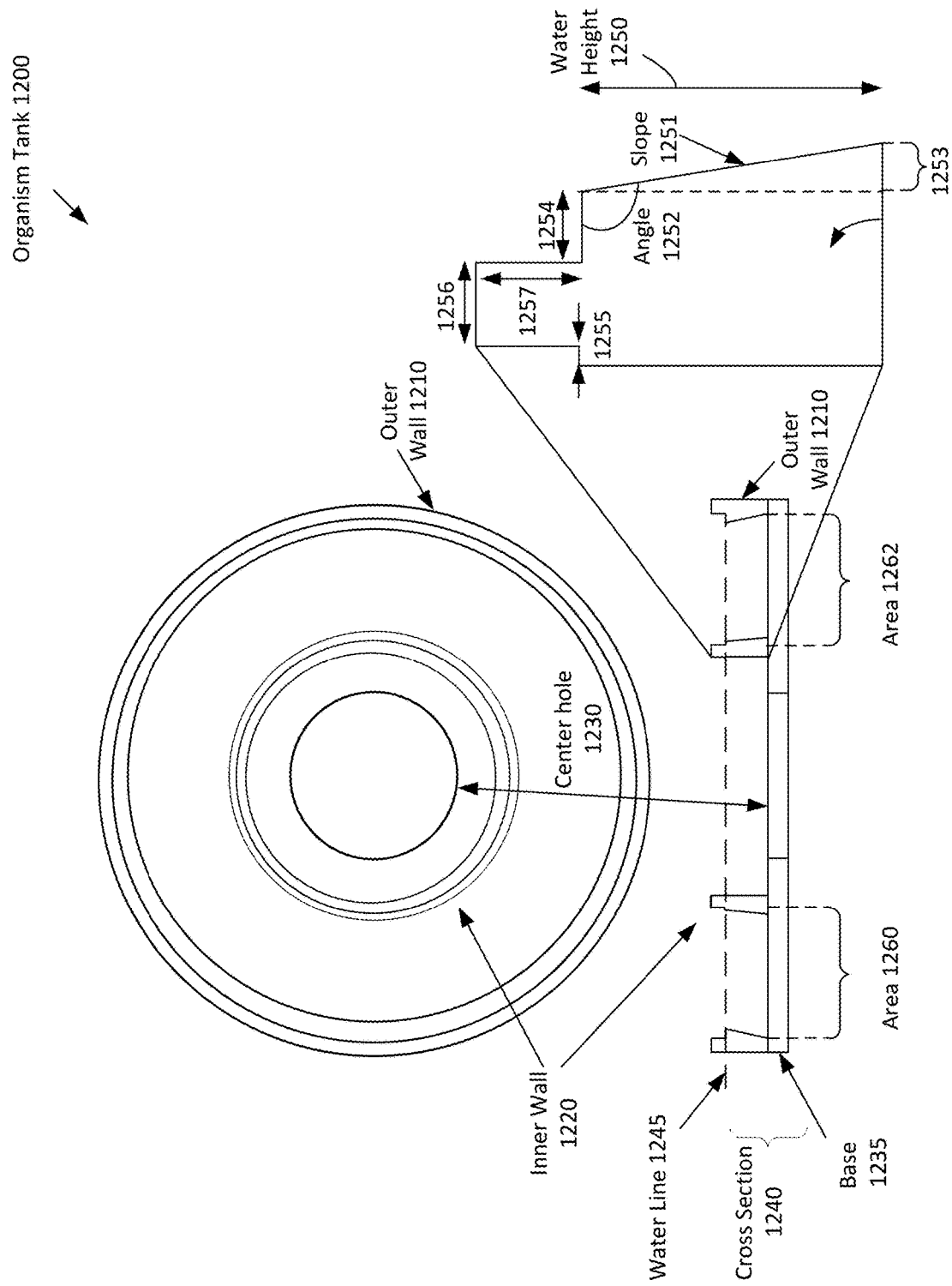
FIG. 12A depicts a cross-section of an example organism tank according to some embodiments.

FIG. 12A depicts a cross-section of an organism tank 1200 according to some embodiments. A cross-section 1240 depicts further details of an outer wall 1210, an inner wall 1220, and a center hole 1230 of the example tank container. Organism tanks provide a sustainable living habitat for aquatic organisms under observation while providing adequate illumination conditions in the region of the organism tank (e.g., region of interest, or ROI) where the aquatic organism is present.

To create a clearly visible ROI, organism tanks may be free of shadow areas in which aquatic organisms could potentially hide. To reduce shadow areas in which aquatic organisms could hide and to avoid undesirable reflections on the organism tank's walls, the design of the organism tank may support a radially symmetrical horizontal light field that propagates from the center of the organism tank (e.g., radially transmitted from the central optical assembly). Furthermore, the organism tank 1200 may be designed so that the aquatic organisms are visible everywhere in the ROI and not hidden by parallax effects or by reflections of the outer wall 1210, the inner wall 1220, a bottom of the organism tank 1200, and the surface of the water.

The typical surface curvature of the water meniscus where the water contacts the walls of the organism tank 1200 may create problems by deviating stray light rays from the light source back toward the image capture device and interfering with the light from the aquatic organisms. In some embodiments, the architecture of the outer wall 1210 and the inner wall 1220 of the organism tank 1200 depicted in FIG. 12A may reduce the effect of the water meniscus when the organism tank 1200 is filled with water.

To reduce the effect of the water meniscus, prevent reflections, and avoid places for organisms to hide, the outer wall 1210 and/or the inner wall 1220 may include an angle change and a rabbet (i.e., recess or groove cut into a wall) located at a particular distance from a water-facing side (e.g., the side facing the well) of the cross-section of the wall. In various embodiments, the slope may be on both the inner wall 1220 and the outer wall 1210. The rabbet may reduce the effect of water meniscus, while slopes of the walls may assist with keeping the organisms in a camera's field of view and avoid reflections. The outer side of each wall (e.g., the side of the wall facing away from the well) may be straight (e.g., at a 90-degree angle from the base of the organism tank) or at any angle.

In the example of FIG. 12A, rabbets (e.g., ledges) on the walls are facing the area of the organism tank 1200 where the water and organisms would be. In this example, there are rabbets extending from the walls over area 1260 and rabbets extending from the walls over area 1262. It will be appreciated that opposing rabbets may be of different lengths (e.g., one ledge may be shorter than the other). For example, the rabbet facing area 1262 of the inner wall may be smaller or shorter than the rabbet facing area 1262 from the outer wall 1210. Similarly, the rabbets of the outer wall 1210 and/or the inner wall 1220 may be at the same or different heights from the base of the organism tank 1200. When the organism tank 1200 is filled to the edge with water, the water meniscus effect may no longer be visible when compared to an organism tank 1200 with a straight, rectangular tank wall without a rabbet.

Similarly, in the example of FIG. 12A, the walls of the organism tank 1200 that are facing the water where the organisms would be are angled. In this example, the outer wall 1210 facing the reservoir is angled inwards (e.g., sloping towards the outer wall 1210). The angle of the wall may assist in reducing reflections in the camera's field of view while preventing the organisms from hiding from the camera's field of view. The inner wall 1220 facing the reservoir may be angled outwards (e.g., sloping away from the inner wall 1220 and towards the outer wall 1210). The angle of the inner wall may prevent the organisms from hiding from the camera's field of view and prevent reflections in the field of view. The slopes of the inner and outer walls may be different.

It will be appreciated that, in some embodiments, one or more organism tanks may not have any rabbets and/or angled walls. Further, one or more organism tanks may have a rabbet on only one wall and not the other (e.g., a rabbet on the outer wall 1210 facing the reservoir but not a rabbet on the inner wall 1220 facing the same reservoir). Similarly, one or more organism tanks may have an angled wall (e.g., on the outer wall) but not the other wall (e.g., not on the inner wall).

The cross-section 1240 of the organism tank 1200 shows in more detail the architecture of the outer wall 1210 and the inner wall 1220. A water height 1250 from the base of the organism tank 1200 to the ledge may correspond to a water line 1245, which represents a fill line for the organism tank 1200. In one example, the water height 1250 is 5 mm or substantially 5 mm. In the cross-section 1240, areas 1260 and 1262 represent the area of the organism tank 1200 that is filled with water or some other liquid. Although areas 1260 and 1262 are identified with different element numbers, it will be appreciated that the areas are part of the same toroidal reservoir (e.g., as seen in the top-down view of the organism tank in FIG. 12A).

A slope represents a side of the outer wall 1210 or inner wall 1220. In this example, slope 1251 of the inner wall 1220 is located at an angle 1252. The slope 1251 may have an offset 1253. The angle 1252 ensures that the organism stays within the image capture device's field of view, and may reduce or prevent rays of light reflecting onto the image capture device from the light source on the walls of the organism tank 1200. An angle of the outer wall 1210 may ensure that the organism stays within the image capture device's field of view and may reduce or prevent rays of light reflecting onto the image capture device from the light source on the walls of the organism tank 1200.

In some embodiments, the outer wall 1210 or the inner wall 1220 may have a wall height (e.g., that is different from that of the water height 1250). In some embodiments, at the rabbet, the width of the outer wall 1210 may be greater than the width of the inner wall 1220 at the rabbet. In some embodiments, at the rabbet, a wall may have a thickness 1256 and a height 1257.

In several embodiments, the outer wall 1210 and the inner wall 1220 may be relatively short compared to the distance between the first and second platforms (e.g., see FIG. 1). For example, the height of the outer wall of the organism tank, as measured from the base of the organism tank, may be 1 cm to 2 cm. The distance between the first and second platforms may be 20 cm or more. As such, the height of the inner and/or outer wall of the organism tank may be a tenth or less of the distance between the first and second platforms. If there is not a tank enclosure surrounding the organism tank, then the organism tank is open to extraneous light from the environment (e.g., light from ceiling or floor lights in a room or laboratory). The extraneous light from the environment, however, may not impact images or measurements taken by the digital capture device(s) of the well in the open organism tank.

In some embodiments, the offset 1253 has a measure of 0.72 mm or substantially 0.72 mm. In some embodiments, the measures 1254 and 1255 are 1 mm and 0.5 mm, respectively. In some embodiments, the thickness 1256 is 1.625 mm. In various embodiments, the outer wall height is 5.125 mm or substantially 5.125 mm. The slope 1251, offset, angle, wall heights, and the like may be any measurements.

In some embodiments, the organism tank 1200 may be assembled by adhering two circular sections concentrically on a base disk as depicted in FIG. 12A. The organism tank 1200 includes a center hole 1230 for centering the organism tank 1200 into a tank container (not shown). A tank illuminator holder may also be placed in the center hole.

The diameters of an outer wall 1210 and an inner wall 1220 may be configured based on the number of aquatic organisms that will be in each organism tank, the size of the aquatic organisms, and/or other factors such as the length of the experiment, whether or not the hardware system will include a water recirculation system, etc.

Figure 12B:
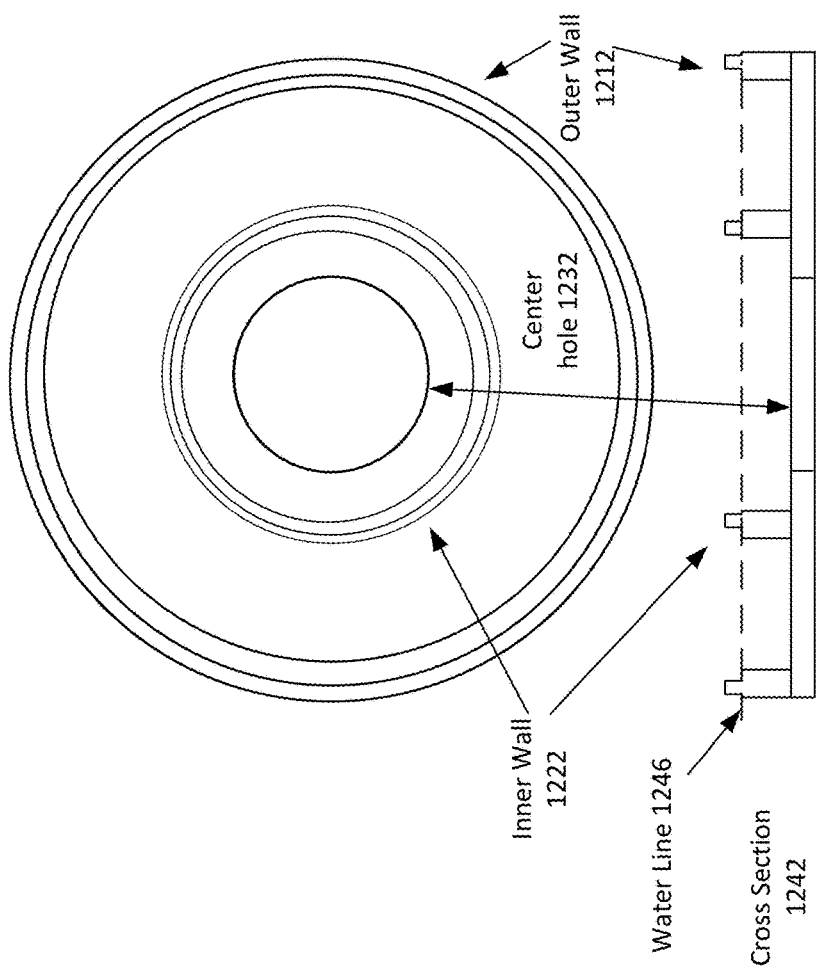
FIG. 12B depicts a cross-section of another example organism tank according to some embodiments.

FIG. 12B shows the cross-section 1242 of a different tank configuration in which the inner wall has a larger diameter than the center hole. Similar to the organism tank 1200 of FIG. 12A, an organism tank 1270 includes an outer wall 1212, an inner wall 1222, and a center hole 1232. In this example, FIG. 12B depicts the inner wall 1222 and the outer wall 1212 as not including any tapered slopes. Further, the rabbets on the inner wall 1222 and the outer wall 1212 may be different sizes. The water line 1246 may reach the rabbets on the inner wall 1222 and the outer wall 1212.

The organism tank 1270 may be assembled by adhering two circular sections concentrically on a base disk as depicted in FIG. 12B. The organism tank 1270 includes a center hole 1232 for centering the organism tank 1270 into a tank container (not shown). A tank illuminator holder may also be placed in the center hole.

FIG. 13 depicts an example of a central optical assembly 1300, including a first surface mirror according to some embodiments. The central optical assembly 1300 transforms incident, vertical light from the light source to a horizontal, rotationally symmetrical light field. The central optical assembly 1300 depicts one embodiment of the cone mirror, which includes a metal mirror. In some embodiments, the metal is aluminum. The cone mirror is a 45° reflective cone. In some embodiments, the central optical assembly 1300 has a diameter of 25 mm.

The reflective surface at a tip 1310 of the central optical assembly 1300 is small compared to the reflective surface at other parts of the central optical assembly 1300. The contribution of the tip 1310 to establishing the horizontal light field may be negligible. Furthermore, the tip 1310 may induce stray light as a result of reflections in unspecified directions that may occur at the tip 1310. In some embodiments, the tip 1310 may be removed by drilling a cylinder 1320, centered on the cone axis, through the tip of the central optical assembly 1300.

Figure 22:
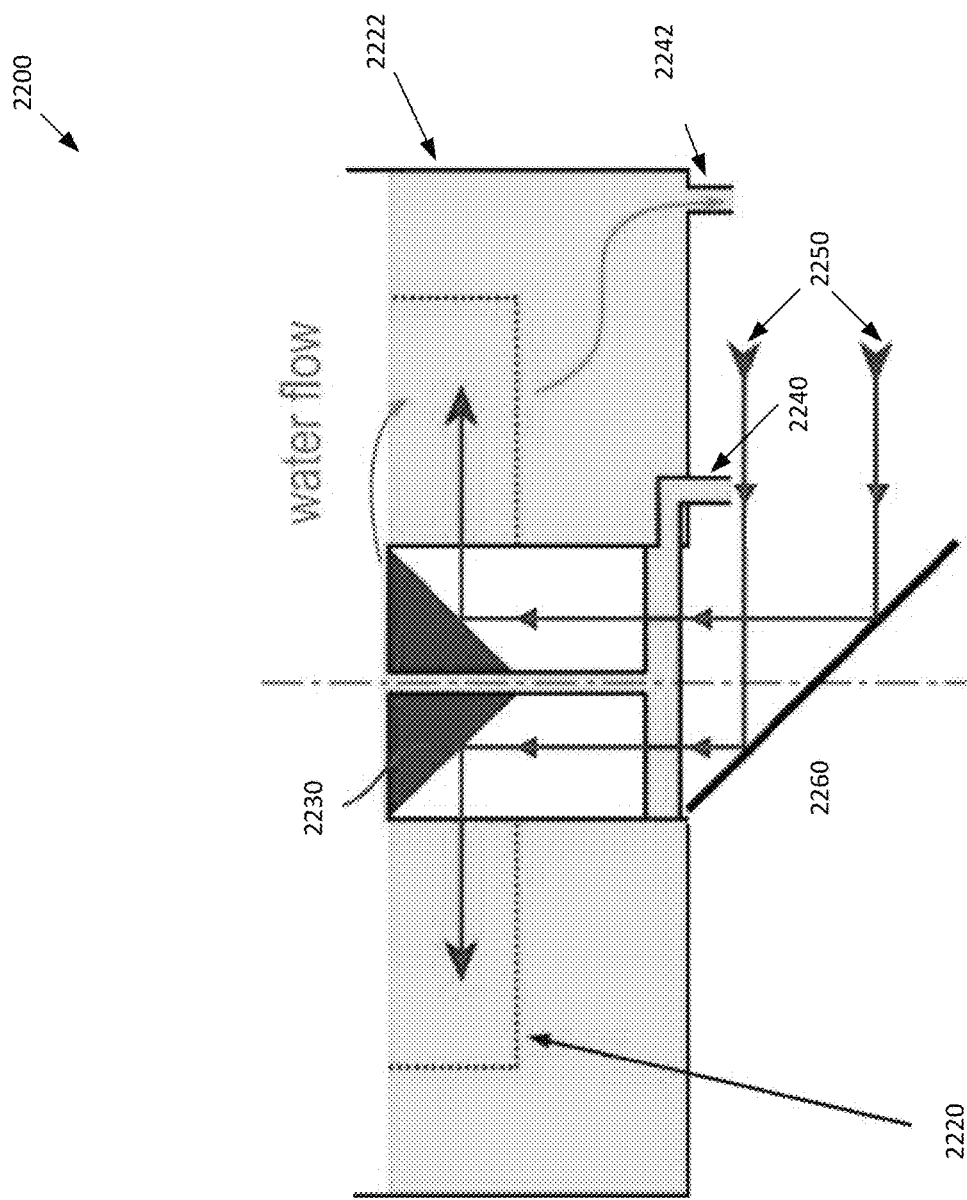
FIG. 22 depicts a recirculating water tank according to some embodiments.

In one embodiment, an axicon may be inserted in an illumination light path before the beam of light arrives at the central optical assembly 1300. By inserting the axicon, the incoming beam of light may no longer reflect on the tip 1310 of the central optical assembly 1300. The axicon is a specialized type of lens that supports a conical surface. The axicon may transform an incoming beam of light into a ring-shaped distribution. In some embodiments, the cylinder 1320 may be used as a part of a conduit that may be used to connect a top side and a bottom side of the tank unit. An example of this embodiment may be seen in FIG. 22, where a cylinder 1320 is used as a conduit between the bottom of a tank container and a top of an organism tank.

Figure 14:
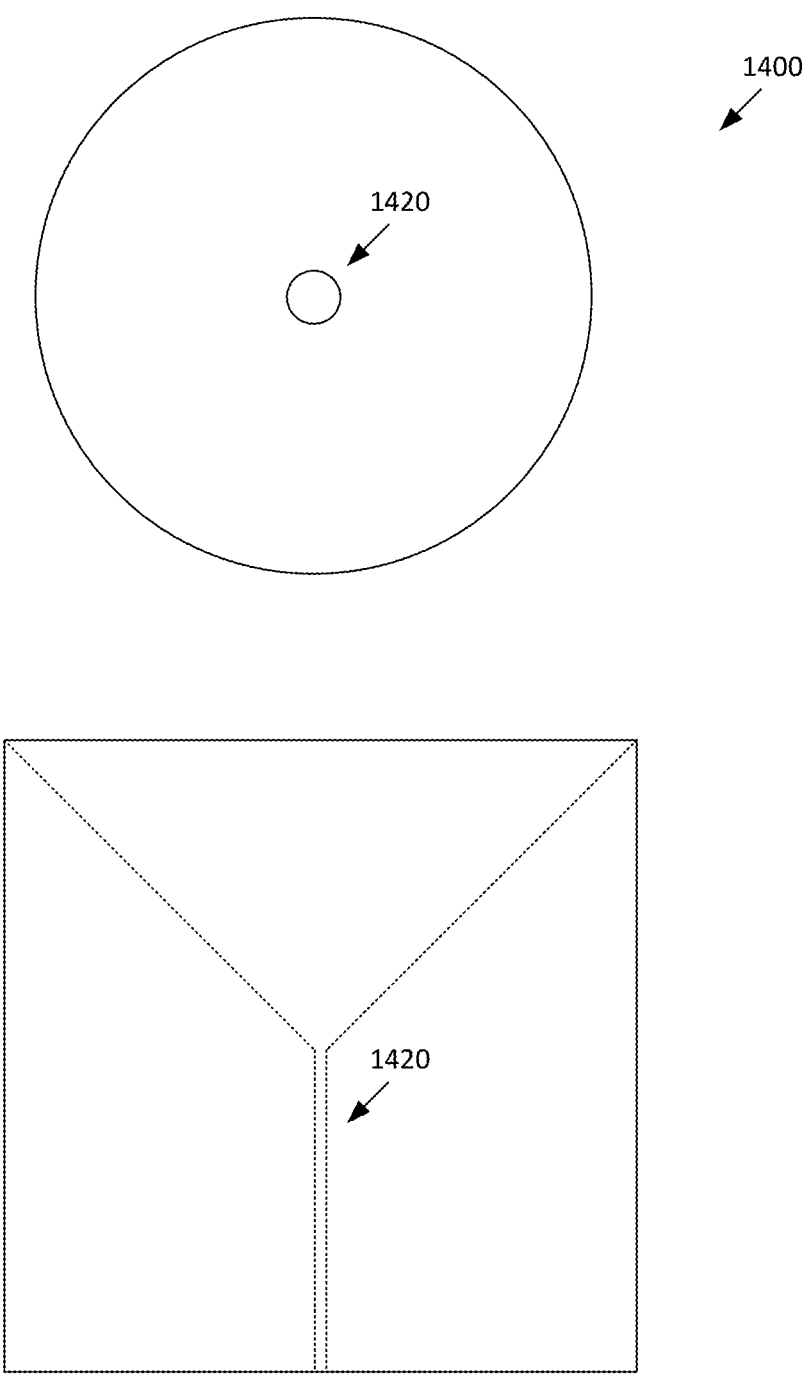
FIG. 14 depicts another example of a cone mirror according to some embodiments.

FIG. 14 depicts another example of a cone mirror 1400 with cylinder 1420, which includes a negative cone acting as a second surface according to some embodiments. Similar to the cone mirror in FIG. 13, the cone mirror 1400 transforms incident, vertical light from the light source to a horizontal, rotationally symmetrical light field. The cone mirror 1400 depicts one embodiment of the cone mirror, which includes an acrylic negative cone mirror. In some embodiments, the angle of the cone in cone mirror 1400 is 90°. The cone mirror 1400 takes advantage of the total internal reflection at a boundary of the acrylic cone mirror and the air.

Figure 15:
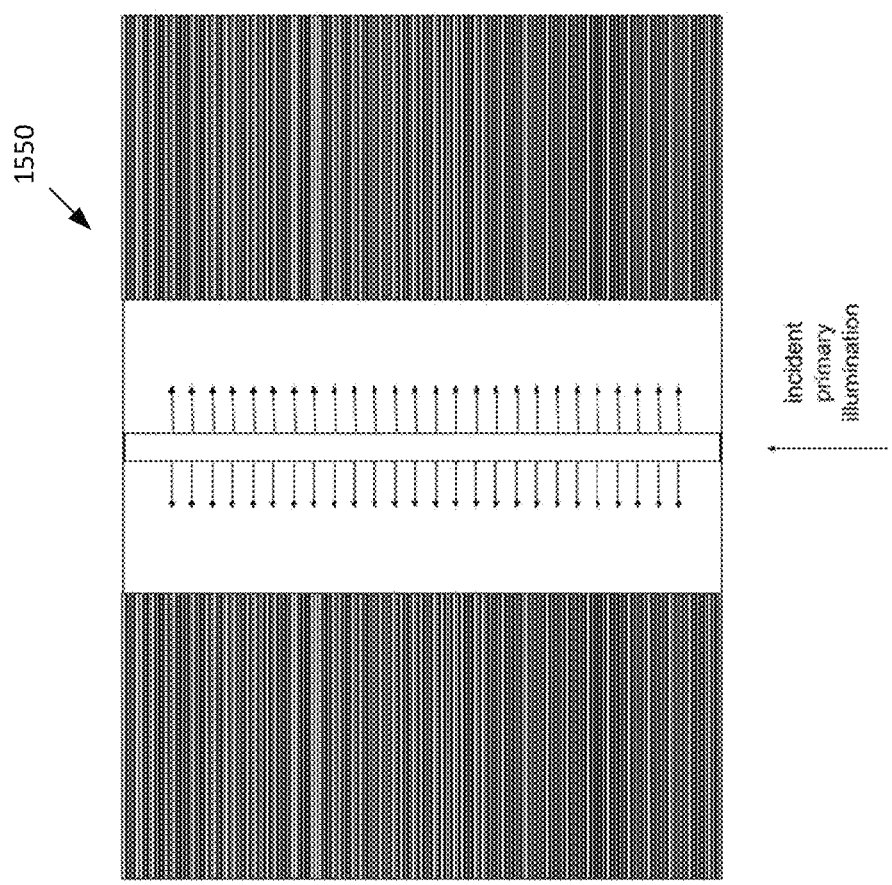
FIG. 15 depicts an example of a cone mirror according to some embodiments.
Figure 15:
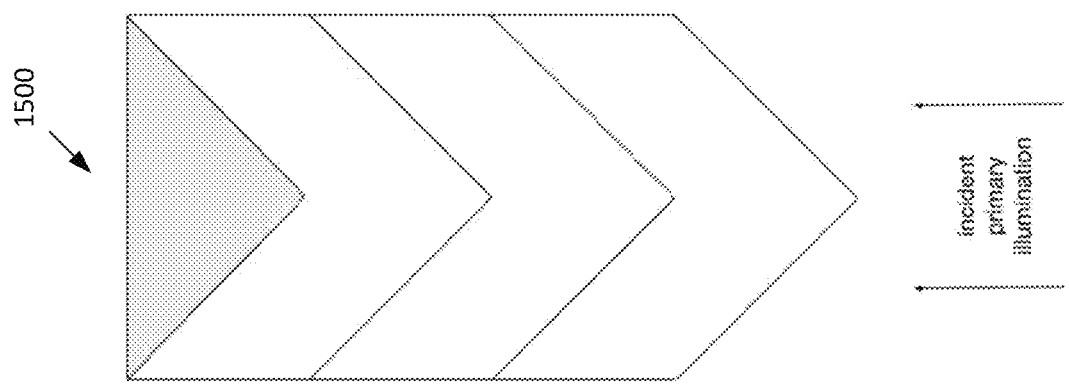

FIG. 15 depicts an example of a cone mirror 1500 according to some embodiments. The cone mirror 1500 is a variation of the mirror of FIG. 13. In some embodiments, the depth of the water column in the organism tank is such that a 45° cone mirror is not practical since the surface area that the cone mirror occupies at the center of the organism tank is directly related to the square of the water column height. The height of a reflected field from the cone mirror may be created with a pencil-shaped structure that combines cone mirrors in series. Semi-reflective conic surfaces reflect a portion of the incident beam from the primary illumination light path. Successive conic surfaces may reflect the remaining portion of the incident beam. In various embodiments, properties of the cone mirror 1500 include a shape of each consecutive reflective surface, reflective medium, and the refractive index of each pencil section may be adjusted based on a number of total sections. In some embodiments, Fresnel equations may be used to determine one or more of the properties of the cone mirror 1500. The cone mirror 1500 may be enclosed in a watertight transparent tube.

In some other embodiments, the process of creating a horizontal primary illumination light field may have resulted in the creation of stray rays that are no longer horizontal. A cylindrical surface made of a stack of thin light conduit rings may be used to remove nonhorizontal stray rays (see book optics 1550). Such rings, which may be thought of as two-dimensional optical fiber, may be made of thin washer-like acrylic discs coated on both surfaces with a fiber coating medium, with the inner surface of the washers shaped to collimate light coming from the center of the illuminator.

It will be appreciated that systems and methods described herein may be applied to a variety of differently shaped tanks (e.g., not simply round organism tanks). In one example, an organism tank of any size may include a central hole which is coupled to a conic mirror, as discussed herein. As similarly discussed herein, a light beam may pass from underneath the organism tank and may be reflected by the conic mirror in a manner parallel to the base of the tank. For example, the tank may be a parallelepipedic tank, including a hole at the center of its base. A conic mirror enclosed by a transparent material (e.g., a mirror button)) may be coupled to the hole at the center of the parallelepipedic tank. The parallelepipedic tank may retain water for aquatic organisms. The water level of the parallelepipedic tank may be at or surpass a top of the conic mirror (e.g., the conic mirror may be enclosed to prevent leaking). In some embodiments, the conic mirror is enclosed in a material that is transparent at the sides and base (e.g., the base being coupled to the base of the parallelepipedic tank) and opaque at the top. Example transparent materials enclosing the conic mirror may be or include the material discussed for the organism tank 1200.

In various embodiments, the conic mirror may be replaced with an "NIR LED button" assembly that includes a battery and a battery-operated laser LED with a collimated beam facing down on a up-facing button mirror (e.g., conic mirror discussed herein). In some embodiments, the entire cylindrical assembly can be positioned at the center of a Petri dish that is imaged from underneath by an up-facing image capture device.

Figure 16A:
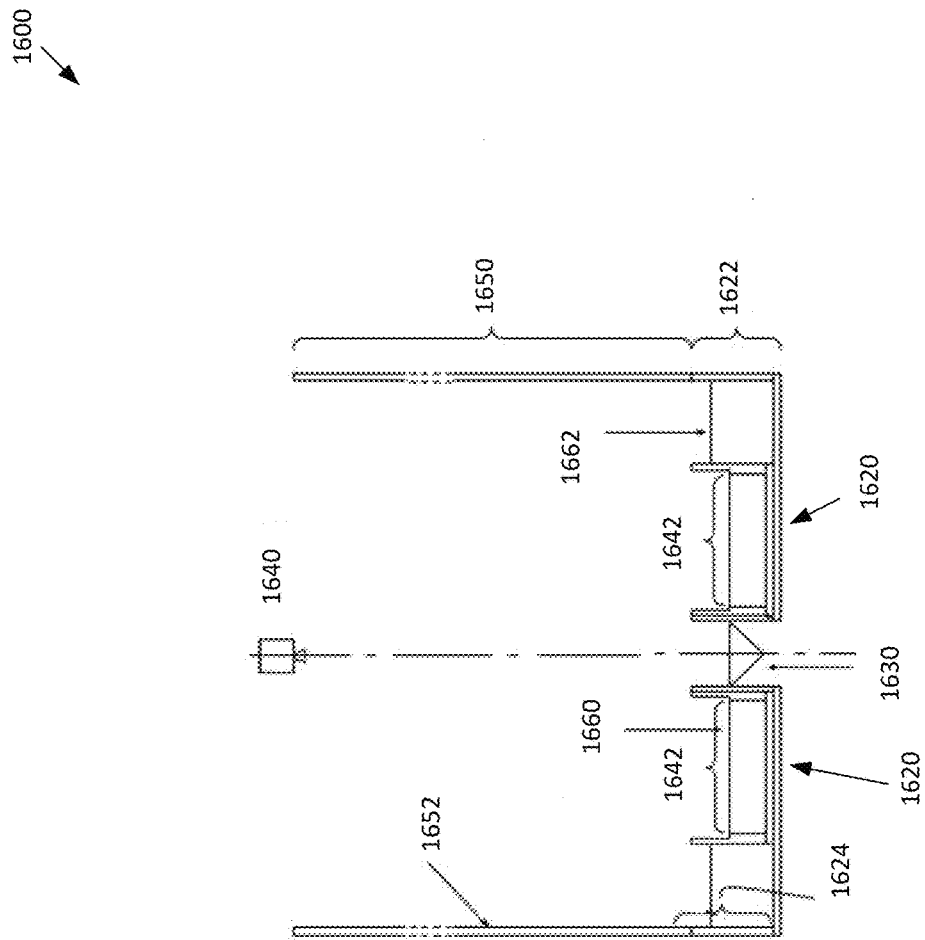
FIG. 16A depicts a cross-section of an example aquatic imaging system according to some embodiments.

FIG. 16A depicts a cross-section 1600 of an example aquatic imaging system according to some embodiments. The cross-section 1600 includes an organism tank 1620, a tank container 1622, a cone mirror 1630, an image capture device 1640, a tank enclosure 1650.

In some embodiments, the aquatic organisms may swim within water contained by the walls of the organism tank 1620. The field of view of the image capture device 1640 may include at least the area of the organism tank 1620 where the aquatic organisms are present is the tank's ROI 1642. In various embodiments, line 1660 represents a water level or fill line of the organism tank 1620.

The organism tank 1620 may be placed within tank container 1622. Line 1662 represents a water level or fill line of tank container 1622. The outer wall of tank container 1622 is outside the organism tank's ROI. However, reflections of light in these areas may be collected for other purposes. For example, the reflections of the aquatic organisms (e.g., in the organism tank on the outer wall of the tank container 1622 or the outer wall 1652 of the tank enclosure 1650) may be used to determine a three-dimensional (3D) position of an aquatic organism. The 3D position of the aquatic organisms may be used to generate a 3D model of the organisms in organism tank 1620.

In some embodiments, when the tank container acts as a light sink, it may be desirable to eliminate any meniscus outside the tank as well, as they may form on the outside of the tank's outer wall or on the inside of the tank container's outer wall. Organism tank and tank container walls can be modified using the same rabetting method to eliminate meniscus, or special inserts, such as reflecting cylinder sections 1684 of FIG. 16B.

Reflections of light on a portion of the tank container 1622 and a lower portion of the tank enclosure 1650, which correspond to an area 1624 are not usually visible to the image capture device 1640. Light beams from the cone mirror 1630 may be reflected from the area 1624. The size of the area 1624 may be determined based on the depth of the water and diameter of the organism tank 1620 and the tank container 1622. When it is beneficial to collect light reflected from area 1624, this reflected light may be collected from the area 1624 by inserting cylindrical surface sections of a reflective material in such a way that: 1) no point of the reflecting surface sections has a center of curvature located on a vertical line that intersects the cone mirror 1630; and 2) each point in the ROI of the organism tank 1620 is contained in a vertical plane that orthogonally intersects one of the reflective surface sections. This is illustrated in FIG. 16B

Figure 16B:
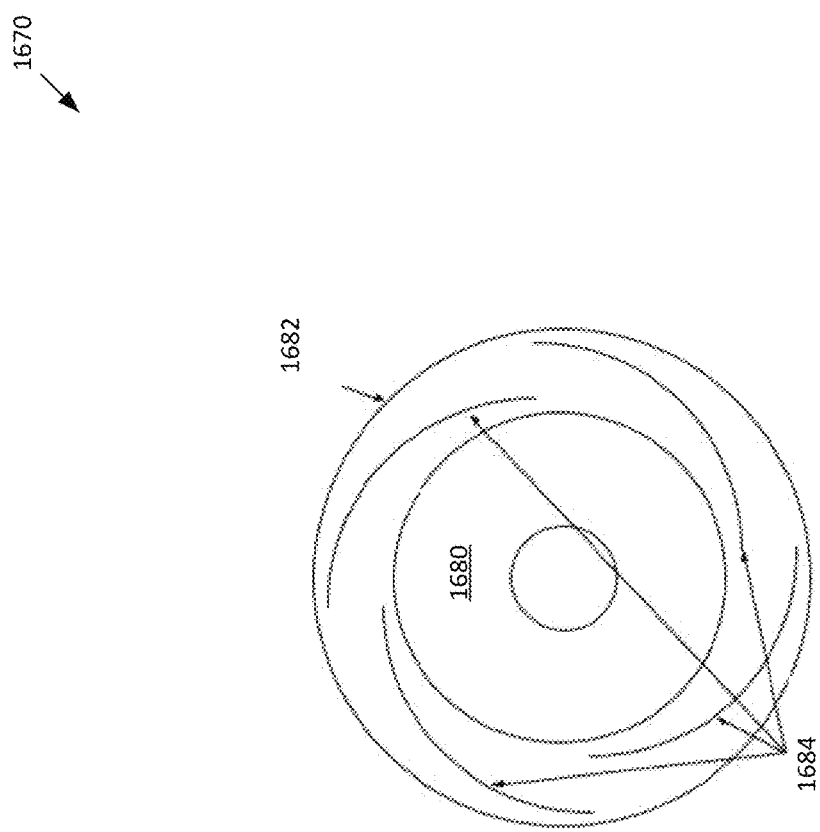
FIG. 16B depicts one configuration of an organism tank and tank container with cylindrical sections according to some embodiments.

FIG. 16B illustrates one configuration 1670 of an organism tank 1680 and a tank container 1682 with multiple cylindrical sections 1684 around inner diameter 1976.

FIG. 17 depicts an image and a magnified detail of a hatching chamber of an organism tank 1710 according to some embodiments. The organism tank 1710 includes a hatching chamber 1720 and a central area 1730. The organism tank hatching chamber 1720 may be a partitioned area of a single-well organism tank used to isolate or protect offspring or embryo organisms. Embryos may be placed in the hatching chamber 1720, while other organisms, such as organisms after the embryos hatch, can be placed in a central area 1730 without requiring two separate tanks. In some applications or experiments, it may be required to continuously monitor or record organisms as they complete their growth and maturity without interruption created by moving or removing organisms from the organism tank. Organism tanks may be dynamically dismountable, with parts removed from or inserted into the organism tank or tank container environment without disrupting the organisms or the capture of the organisms within the tank. The configuration of the organism tank 1710 may result from placing a tank insert, such as the tank insert 1800 of FIG. 18, into an organism tank.

Figure 18:
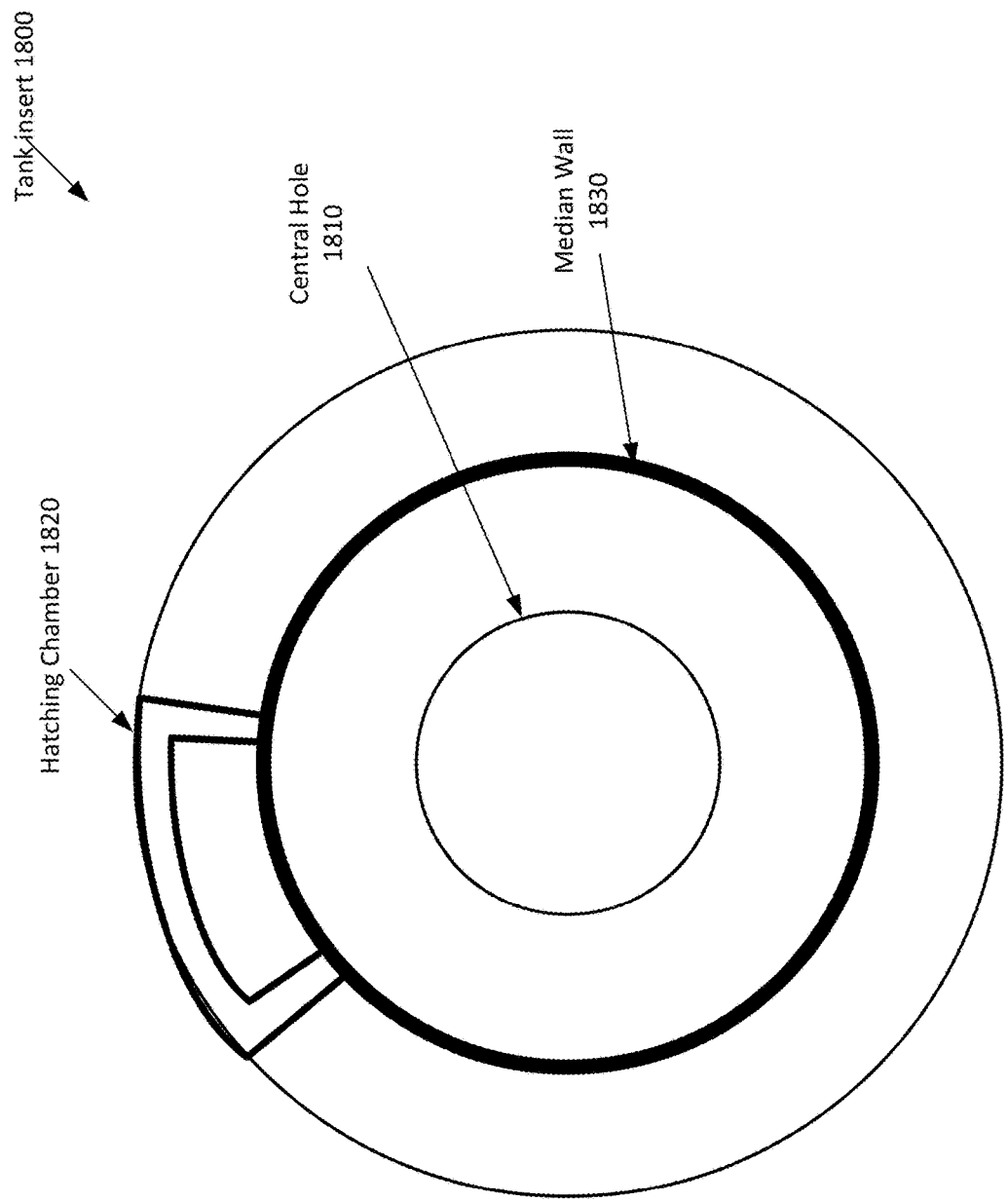
FIG. 18 depicts an example of a tank insert according to some embodiments.

FIG. 18 depicts an example of a tank insert 1800 according to some embodiments. The tank insert 1800 may be inserted into an organism tank, such as the organism tank 1710 of FIG. 17. The tank insert 1800 may include a base disk with a central hole 1810, a hatching chamber 1820, and a median wall 1830. The central hole 1810 allows the base disk to fit the inner wall of the organism tank. The hatching chamber 1820 may be a 500 microliter (µL) hatching chamber shaped and positioned to preserve radial symmetry and adhered to the median wall 1830. In some embodiments, the hatching chamber 1820 may be a removable insert comprising three walls shaped and affixed to the median wall 1830, which makes up the 4th wall creating an enclosure.

Organism embryos may be placed in the hatching chamber 1820, while older or more mature organisms may be placed in a central area of the organism tank. The walls which make up the hatching chamber 1820 may be removed to reconfigure the organism tank without disturbing the organisms within the tank. The median wall 1830 may also be removed to reconfigure the organism tank without disturbing the organisms within the tank.

To support applications and experiments in which aquatic organisms need to be maintained in small water volumes, multi-well tanks that preserve the radial symmetry of their illuminated field can be generated by creating concentric, compartmented cells. FIG. 19A depicts examples of multi-well tanks according to some embodiments, including organism tanks 1900, 1920, 1940, and 1960.

A formula may be used to compute the dimension of a sequence of partitioning rings $r_n$, themselves equally partitioned in $l_n$ cells of constant volume v as a function of the tank depth h and the partition thickness $\theta$, as follows:

$$r_{ne} = \frac{l_n}{2\pi}\left(\theta \pm \sqrt{\theta^2 - \frac{4\pi}{l_n}\left(r_{ni}\left(\theta - \frac{\pi r_{ni}}{l_n}\right) - \frac{v}{h}\right)}\right)$$

where $r_{ne}$ and $r_{ni}$ are the external and internal radius of ring $r_n$, respectively, and $l_n$ is the number of cells to be created between $r_{n-1}$ and $r_n$.

In some embodiments, the organism tank 1960 is a 5 mm deep organism tank with 104 500 µL well fabricated using two mm-thick partitioning walls. Each of the 104 mini-wells may have the same volume or substantially the same volume when filled with water. In some embodiments, the partitioning walls which make up the configuration of mini-wells may be dynamically configurable to change the configuration of an organism tank without disrupting the organism tanks on a platform of the hardware system.

Figure 19B:
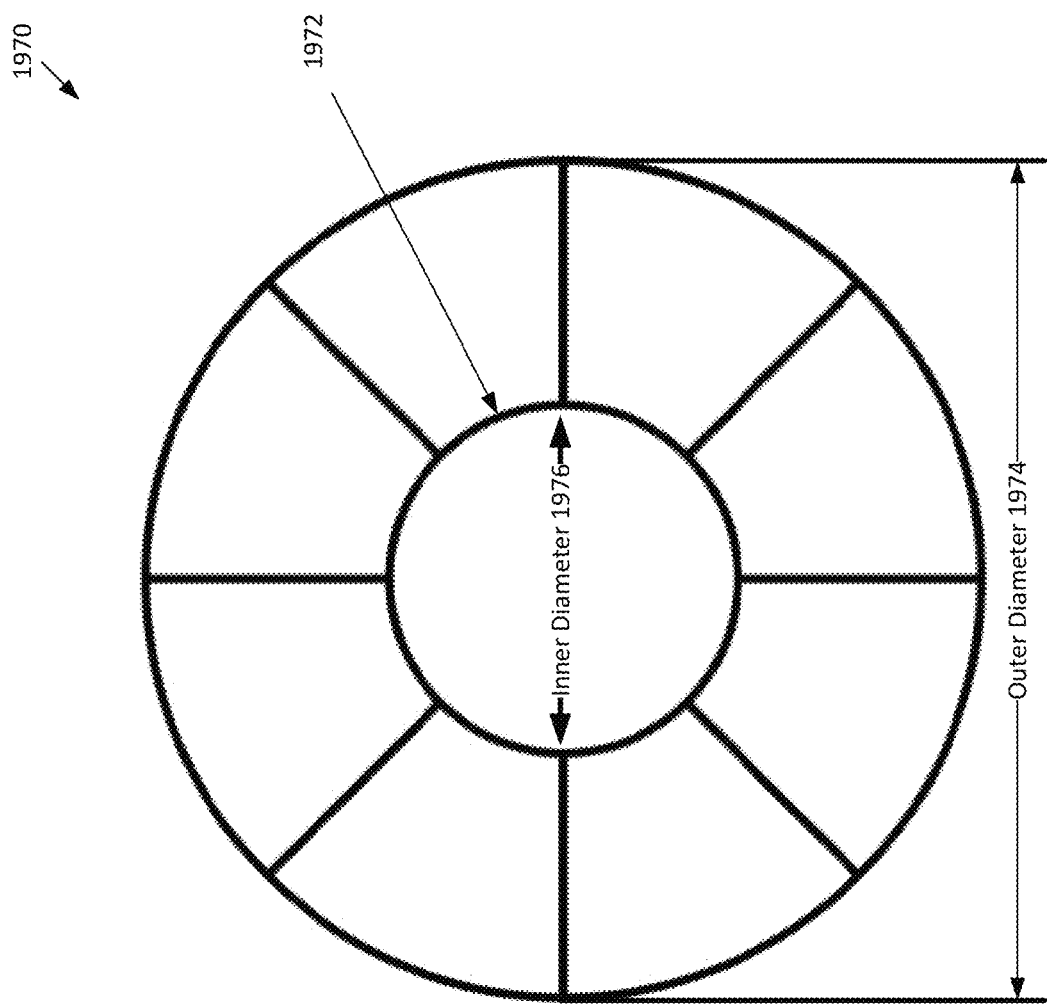
FIG. 19B depicts another example of a multi-well tank according to some embodiments.

In some applications or experiments, the water volumes used to house the aquatic organism are so large that the previously described cylindrical organism tank architecture may be impractical. Instead, the base disk may be fitted with a single eight-well multiwell tank of a substantially similar diameter. FIG. 19B depicts multi-well tank 1970, an example of a multiwell tank to fit the base disk according to some embodiments. The multi-well tank 1970 includes an 8-well organism tank with a center hole 1972.

In some embodiments, the multi-well tank 1970 may be substantially the same size as a base disk, such as the first platform 102 of FIG. 1. In one example, the multi-well tank 1970 has an outer diameter 1974 of 55 cm and an inner diameter of 20 cm. Furthermore, instead of having an individual tank illuminator holder for each of the tank's well, a central tank illuminator, such as a 45° reflective cone mirror with a 20 cm diameter, may be utilized to illuminate the multi-well tank 1970. In this embodiment of the hardware system, the tank illuminator may provide a light field to illuminate a 10 cm deep water column. Each of the multiple tanks of the multi-well tank 1970 may have its own dedicated image capture device anchored or positioned on an elevated disk directly above or substantially above their associated organism tank. In some embodiments, the multiple image capture device may be anchored or positioned on the elevated disk towards the center of the multi-well tank 1970 and tilted as needed so that the field of view of each of the multiple image capture devices includes the ROI of their associated organism tank.

Tank inserts may be utilized to define fully visible ROI within each organism tank of the multi-well tank 1970. The tank partition can be covered or made of highly reflective material to provide depth data information or a different imaging angle in a dual imaging path.

It will be appreciated that the image capture devices may capture images of wells (e.g., single or multi-well) organism tanks. Discussed herein include one or more image capture devices being coupled to an elevated platform that takes images of an open well from above the organism tank.

In some embodiments, a paraboloidal mirror, hollowed at its vertex, is positioned above the organism tank (e.g., coupled to the elevated platform) and is faced down (e.g., the concave side is directed) toward the organism tank. In one example, the image capture device is positioned between the paraboloidal mirror and the organism tank, with the image capture device directed towards the paraboloidal mirror and away from the organism tank. A hole in the paraboloidal mirror prevents rays from the tank's central optical assembly from blinding the camera.

In another embodiment, the image capture device is positioned above both the paraboloidal mirror and the organism tank. In this arrangement, the paraboloidal mirror faces down toward the organism tank, and the lens of the image capture device is directed towards the organism tank. The image capture device receives rays through the hole of the paraboloidal, but not directly from the tank. In this case, a ball mirror may be positioned at the focal point of the paraboloidal mirror. The ball mirror may reflect rays bouncing from the tank on the paraboloidal mirror to the image capture device.

In both examples of using the paraboloidal mirror, it will be appreciated that the arrangement may be flipped such that the paraboloidal mirror may face the organism tank from below the organism tank.

The aquatic organisms of the well may be imaged from their reflection in the paraboloidal mirror. These arrangements involving the paraboloidal mirror may allow for images to be captured without parallax-correction (e.g., this may be particularly useful for organism tanks with multi-well arrangements where the walls may or may not be vertical).

Figure 20:
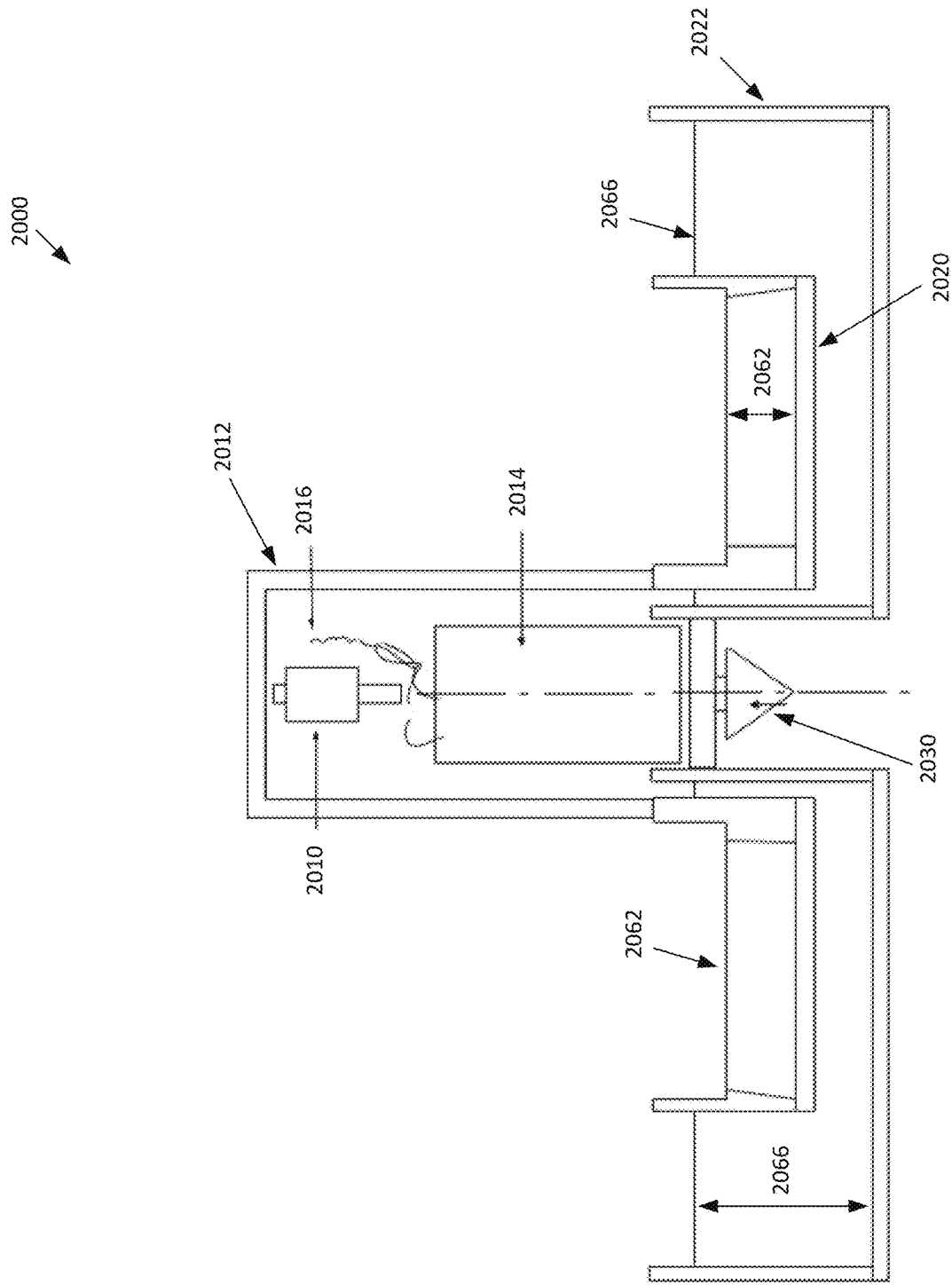
FIG. 20 depicts a tap actuator for mechano-acoustic experiments according to some embodiments.

Some applications or experiments may require a controlled transient noise to be introduced into one or more organism tanks to trigger behaviors in the aquatic organisms in the organism tanks. In some embodiments, the transient noise may be generated using an actuator. The actuator may generate a vibration pattern that may be rotationally symmetric and propagate radially from the actuator. In one configuration, the actuator may be positioned in the center of one or more of the organism tanks of the hardware system. However, since the organism tanks of the disclosed hardware system are typically hollow at their center, reliance on specialized components or assemblies may be required. The placement of the actuator components must not interfere with the field of view of the image capture device. Furthermore, the placement must not interfere with the illumination path of the organism tank. FIG. 20 depicts a configuration of the organism tank 2000 for mechano-acoustic experiments according to some embodiments, which fit several of these criteria.

The configuration of organism tank 2000 includes an actuator 2010, a tubular inner wall extension 2012, a battery compartment 2014, a remote control sensor 2016, an organism tank 2020, a tank container 2022, and a cone mirror 2030. The actuator 2010 may be placed in an area of a tank unit that is directly above the cone mirror 2030. In some embodiments, the tank unit includes the organism tank 2020 and the tank container 2022. In various embodiments, the tank unit includes the organism tank 2020 and does not include the tank container 2022. The placement of the actuator 2010 as seen in FIG. 20 does not interfere with the field of view of an image capture device (not shown in FIG. 20) or the illumination path of the tank unit. The actuator 2010 provides an upward tap onto the tubular inner wall extensions 2012, which rests on, or may be physically coupled to, the inner wall of the organism tank 2020. The physical connection of the tubular inner wall extensions 2012 to the inner wall of the organism tank 2020 allows the transfer of energy from the actuator 2010 to generate a vibration pattern in the water or liquid in the organism tank 2020. In some embodiments, a battery in the battery compartment 2014 may provide power to the actuator 2010. In some embodiments, a remote control sensor (not depicted) may allow a user or the control system to remotely control the actuator 2010 without having wires crossing the imaging path.

In some embodiments, the organism tank 2020 may be floating in a tank container 2022. Each of the organism tanks 2020 has a water column 2062, while the tank container 2022 may have a water column 2066. The tank container 2022 may provide noise, vibration, and thermal isolation. Each of the multiple organism tanks may be isolated from one another such that a vibration generated by an actuator associated with one organism tank will not result in vibrations of water in another organism tank.

The volume of water or liquid in the tank container 2022 may reduce reflections of light from the illumination light path bouncing off the bottom of the organism tank 2020. In some embodiments, the volume of water acts as a light sink. In one embodiment, the thickness of the bottom of the tank container 2022 may be increased to take advantage of the refractive index of the tank's bottom material and make it into a light sink.

The T maze concept used in ethological experiments may be adapted for use in the organism tanks of the hardware system. Behavior control inserts, such as the epsilon mazes seen in FIG. 21, may be used to dynamically reconfigure one or more organism tanks without disrupting the organisms or the image capture of the organisms within the tank. Other behavior control inserts with different maze counts and different tank partitioning may be created in a single organism tank by changing an angular section span of an individual maze and a partition count.

An organism tank 2110 includes epsilon mazes 2112, 2114, 2116, and 2118. Each of the epsilon mazes of the organism tank 2110 includes multiple sections that are accessible by opening a gate or door. In various embodiments, the gate or door may be remotely controlled.

An example of such an ethological experiment can be seen in an organism tank 2150 of FIG. 21, which includes an unpartitioned epsilon maze that provides support for illumination and electrical stimulation. The organism tank 2150 includes four motorized gates, including motorized gate 2160, which can be remotely controlled to slide open or close to present choices of sub-regions of the organism tank 2150. For example, the motorized gate 2160 may slide open to block off access to sub-region 2170 while presenting access to sub-region 2172.

Other ethological experiments may require a projection of a scene in order to monitor the reaction of organisms to the scene. For example, a moving image may be projected onto an organism tank to create an illusion of a water current and induce related visuomotor behaviors from the aquatic organisms in the organism tank. In some embodiments, a pico-projector, such as the pico-projector 370 of FIG. 3B may be used as a part of a secondary image path to project a scene onto one or more organism tanks. In various embodiments, the secondary control system is a single-board computer that is used to control a dual-camera recording setup or a pico-projector to reduce the computation load on the primary control system.

In one embodiment, wall segments that comprise part of the unpartitioned epsilon maze may be utilized as anodes, while vertical rods distributed along an outer diameter of the organism tank 2150 are utilized as cathodes to create a transient electric field. Each of the different sub-regions of the organism tank 2150 may be illuminated in different colors and deliver a mild electric shock to any organisms visiting sub-regions of a certain color.

In some embodiments, a passive water recirculation is supported by tank unit assemblies that include a tank container equipped with a water outlet and an organism tank with porous walls that receive water from a central inlet. An example of the passive water recirculation tank unit can be seen in FIG. 22. Tank unit 2200 includes an organism tank 2220, tank container 2222, and a cone mirror 2230. In some embodiments, the tank unit 2200 may include a water inlet 2240 and a water outlet 2242. The organism tank 2220 may support porous walls that receive water from the water inlet 2240 in the central optical assembly or the cone mirror 2230 via a transparent container below the cone mirror 2230. The transparent container would not interfere with the delivery of light (e.g., light 2250) from a light source to a mirror 2260. The water in tank container 2222 may be maintained at a pressure required to maintain a constant flow by a central reservoir. In some embodiments, the central reservoir may be central cylinder 490 of FIG. 4, which may allow the base disk to support the elevated disk.

Figure 23:
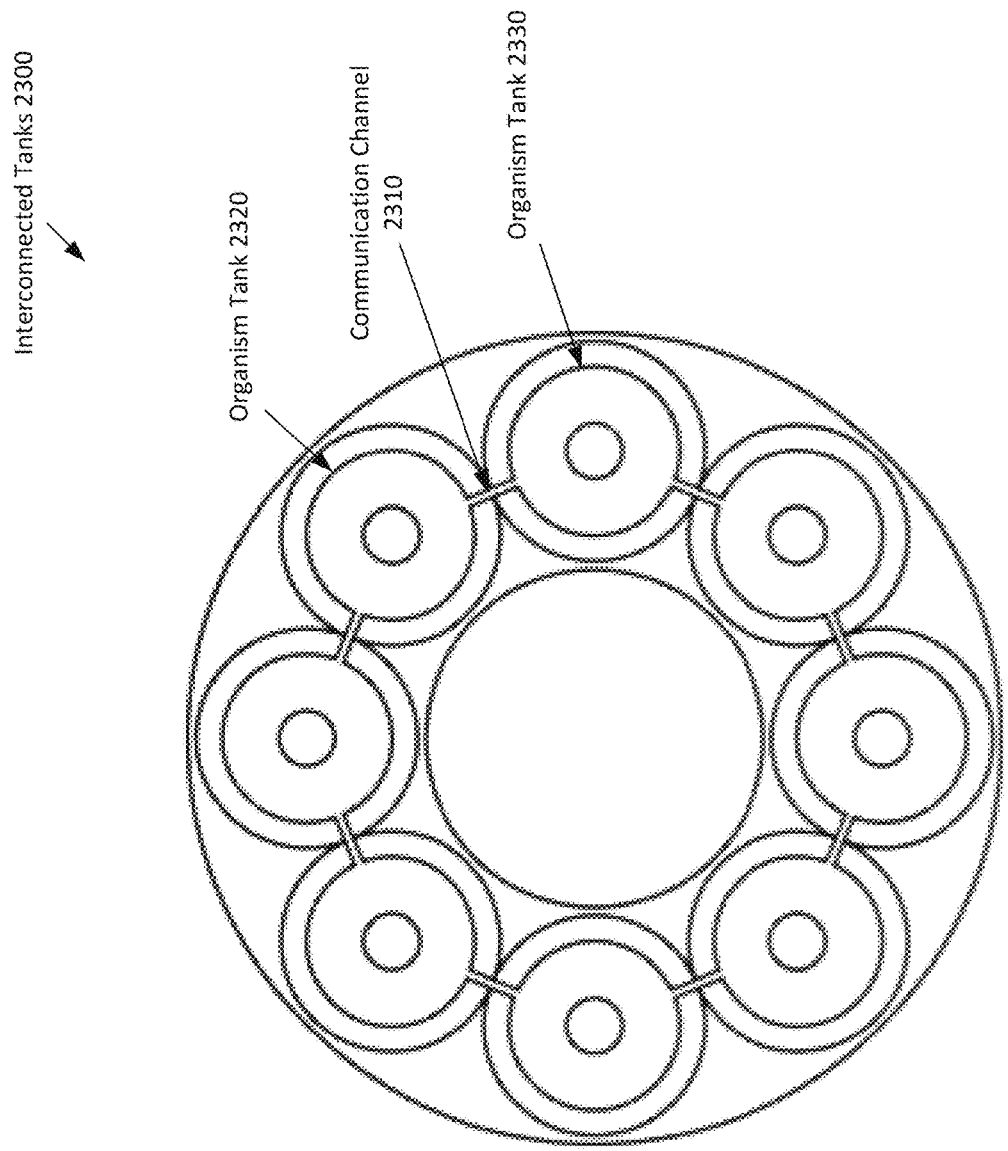
FIG. 23 depicts a configuration of tank containers and interconnected tanks according to some embodiments.

FIG. 23 depicts a configuration of interconnected tanks 2300 according to some embodiments. In some applications, such as place-preference experiments, it may be desirable to provide the aquatic organisms with the option to change tanks. The interconnected tanks 2300 includes communication channels, such as a communication channel 2310 connecting adjacent interconnected organism tanks 2320 and 2330. The orientation and field of view of image capture devices corresponding to the organism tanks 2320 and 2330 may include the organism tanks 2320 and 2330. In some embodiments, the orientation of the walls of the communication channel 2310 is adjusted to align with the orientation and field of view of the corresponding image capture devices.

The invention claimed is:

1. An aquatic organism apparatus comprising a first organism tank having a first base, an outer wall, an inner wall, and a central hole, the outer wall being formed at a first perimeter of the first base, the inner wall being formed at a second perimeter of the first base, the first base, the outer wall, and the inner wall defining at least a first well capable of retaining liquid, the first perimeter being greater than the second perimeter, the outer wall including at least one of an angle change and a rabbet, the central hole being in a center of the first organism tank, the first organism tank configured to receive a first light beam originating from a first light source and configured to project at least a portion of the first light beam through the first well.

2. The aquatic organism apparatus of claim 1, wherein each of the outer wall and inner wall includes a first side, a second side, a top side, and a bottom side, the first side of each of the outer wall and inner wall being a well-facing side, the bottom side of each of the outer wall and the inner wall being coupled to the first base, the top side of the outer wall having a first width and the top side of the inner wall having a second width.

3. The aquatic organism apparatus of claim 2, wherein the angle change of the first side of the outer wall such that the bottom side of the outer wall having a third width, the third width being less than the first width.

4. The aquatic organism apparatus of claim 2, wherein the angle change of the first side of the outer wall such that the bottom side of the outer wall having a fourth width, the fourth width being greater than the first width.

5. The aquatic organism apparatus of claim 2, wherein the rabbet of the outer wall is a protrusion formed on a top side of the outer wall.

6. The aquatic organism apparatus of claim 1, further comprising a rabbet formed on a top side of the inner wall of the first organism tank.

7. The aquatic organism apparatus of claim 1, further comprising a central optical assembly, the central optical assembly being configured to project at least a portion of a first light beam through the first well, the central optical assembly being configured to be coupled to the central hole of the first organism tank.

8. The aquatic organism apparatus of claim 7, wherein the central optical assembly includes a conic mirror radially configured to receive at least a portion of the first light beam from below the first base and radially reflect the at least the portion of the first light beam from the central hole, through the inner wall, and through the first well.

9. The aquatic organism apparatus of claim 1, further comprising:
a first light source;
a first platform coupled with a first image capture device, the first image capture device having a first field of view; and
a second platform that is parallel to the first platform, the second platform being coupled to the first organism tank.

10. The aquatic organism apparatus of claim 9, wherein the second platform is coupled to a second organism tank in addition to the first organism tank, the first platform being coupled to a second image capture device the second organism tank configured to receive a second light beam originated from the first light source and configured to project at least a portion of the second light beam through a second well and in a directional plane that is parallel to a base of the second organism tank, the second image capture device configured to direct a second field of view from the first platform to at least the well in the second organism tank, the first and second field of views occupying separate and distinct areas from each other.

11. The aquatic organism apparatus of claim 10, further comprising a beam splitter device configured to split light received from the first light source into the first light beam and the second light beam.

12. The aquatic organism apparatus of claim 10, the first image capture device capable of generating images of the first well of the first organism tank simultaneously as the second image capture device generating images of the second well of the second organism tank.

13. The aquatic organism apparatus of claim 9, wherein the second platform supports the first base of the first organism tank, the first organism tank including a bottom and an open top, the bottom being the first base, a side of the at least one outer wall not facing the well being at a 90 degree angle to the base, and the first image capture device configured to direct the first field of view to the open top of the first organism tank.

14. The aquatic organism apparatus of claim 9, the at least one outer wall having a height from the first base of the first organism tank that is less than a fourth of a distance between the first platform and the second platform.

15. The aquatic organism apparatus of claim 1, wherein the inner wall is transparent.

16. The aquatic organism apparatus of claim 15, wherein the first organism tank is composed of one of poly (methyl methacrylate) or acrylic.

17. The aquatic organism apparatus of claim 1 wherein the first organism tank is composed of one of high-density polyethylene, polytetrafluoroethylene, polyvinyl chloride, acrylonitrile butadiene styrene, aluminum, silver, biaxially-orientated polyethylene terephthalate.

* * * * *